(12) United States Patent
Milanovic et al.

(10) Patent No.: US 11,927,743 B2
(45) Date of Patent: *Mar. 12, 2024

(54) HEAD UP DISPLAY BASED ON LASER MEMS EMISSIVE FILM PROJECTION SYSTEM

(71) Applicant: Mirrorcle Technologies, Inc., Richmond, CA (US)

(72) Inventors: Veljko Milanovic, Richmond, CA (US); Abhishek Kasturi, Pleasanton, CA (US)

(73) Assignee: MIRRORCLE TECHNOLOGIES, INC., Richmond, CA (US)

(*) Notice: Subject to any disclaimer, the term of this patent is extended or adjusted under 35 U.S.C. 154(b) by 845 days.

This patent is subject to a terminal disclaimer.

(21) Appl. No.: 16/983,831

(22) Filed: Aug. 3, 2020

(65) Prior Publication Data

US 2020/0363634 A1    Nov. 19, 2020

Related U.S. Application Data

(60) Continuation of application No. 16/455,498, filed on Jun. 27, 2019, now Pat. No. 10,732,403, which is a
(Continued)

(51) Int. Cl.
*G02B 26/10* (2006.01)
*G02B 26/08* (2006.01)
(Continued)

(52) U.S. Cl.
CPC ....... *G02B 26/101* (2013.01); *G02B 26/0833* (2013.01); *G02B 27/0101* (2013.01);
(Continued)

(58) Field of Classification Search
None
See application file for complete search history.

(56) References Cited

U.S. PATENT DOCUMENTS 5,619,488 A  4/1997 Ota et al.
5,646,766 A  7/1997 Conemac
(Continued)

OTHER PUBLICATIONS

Chao, F., He, S., Chong, J., Mrad, R. B., Feng, L., "Development of a Micromirror Based Laser Vector Scanning Automotive HUD," Proc. Of the 2011 IEEE International Conf. on Mechatronics and Automation, Aug. 2011, China.
(Continued)

*Primary Examiner* — Jennifer D. Carruth
(74) *Attorney, Agent, or Firm* — JDI PATENT; Joshua D. Isenberg; Robert Pullman

(57) ABSTRACT

An apparatus includes a scan module having one or more laser sources that generate one or more initial laser beams and two or more beam deflectors that deflect the initial laser beam(s). A beam optic substantially collimates the initial laser beam(s) to produce one or more collimated laser beams. One or more beam deflector controllers control the angle of beam deflection from each beam deflector. Relay optics between the two or more beam deflectors image each sequential beam deflector onto the subsequent beam deflector in such a manner that the beam deflecting from the last beam deflector in an optical chain contains a combination or superposition of all the beam deflections of the beam deflectors in the sequence, and maintains a beam divergence of the one or more collimated beams.

17 Claims, 26 Drawing Sheets

MEMS Mirror 1: Quasistatic Dual-Axis (4Q), 2D Vector Scan

MEMS Mirror 2, Quasistatic Dual-Axis (4Q), 2D Vector Scan

Output Scan

Related U.S. Application Data division of application No. 15/202,476, filed on Jul. 5, 2016, now Pat. No. 10,338,377.

(60) Provisional application No. 62/189,076, filed on Jul. 6, 2015.

(51) Int. Cl.
*G02B 27/01* (2006.01)
*G02B 27/14* (2006.01)

(52) U.S. Cl.
CPC ....... *G02B 27/0172* (2013.01); *G02B 27/141* (2013.01); *G02B 2027/0114* (2013.01)

(56) References Cited

U.S. PATENT DOCUMENTS

| | | | |
|---|---|---|---|
| 6,134,050 | A | 10/2000 | Conemac |
| 7,295,726 | B1 | 11/2007 | Milanovic et al. |
| 7,428,353 | B1 | 9/2008 | Milanovic et al. |
| 8,228,579 | B2 | 7/2012 | Sourani |
| 10,338,377 | B1 | 7/2019 | Milanović et al. |
| 10,732,403 | B2 * | 8/2020 | Milanovic ............ G02B 26/101 |
| 2008/0002159 | A1 | 1/2008 | Liu et al. |
| 2008/0018558 | A1 | 1/2008 | Kykta et al. |
| 2008/0061026 | A1 | 3/2008 | Milanovic et al. |
| 2008/0204839 | A1 * | 8/2008 | Murakami ........... G02B 26/085 359/199.1 |
| 2009/0116107 | A1 | 5/2009 | Kindler et al. |
| 2012/0050144 | A1 | 3/2012 | Morlock |
| 2014/0028805 | A1 * | 1/2014 | Tohme ............... G01B 11/2518 348/47 |
| 2014/0085741 | A1 | 3/2014 | Lambert |
| 2015/0286120 | A1 | 10/2015 | Ohno et al. |
| 2015/0301182 | A1 | 10/2015 | Geiger et al. |
| 2015/0316838 | A1 | 11/2015 | Laluet et al. |
| 2019/0221988 | A1 | 7/2019 | Villeneuve et al. |

OTHER PUBLICATIONS

Chen, C.Y., Su, W.C., Lin, C.H., Ke, M.D., Deng, Q.L., Chiu, K.Y., "Reduction of speckles and distortion in projection system by using a rotating diffuser," Optical Review, vol. 19, Issue 6, pp. 440-443, Nov. 2012.

Co-Pending U.S. Appl. No. 62/189,076, to Veljko Milanović et al., filed Jul. 6, 2015.

Final Office Action for U.S. Appl. No. 15/202,476, dated Jul. 26, 2018.

Freeman, M. O., "MEMS Scanned Laser Head-Up Display", MOEMS and Miniaturized Systems X, Proc. Of SPIE, vol. 7930, (2011).

Ishibashi, O., et al., "A Direct-View Laser-Phosphor Display with a High-Reflection Wide-Angle-Scanner," SID Digest, pp. 977-980, (2012).

Kadribašić, F., "A MEMS Mirror Laser-Guidance System for CDMS Experiments", Stanford Undergraduate Research Journal. Jun. 2013.

Kawakami, Y., Park, J. H., Akedo, J., Asada, N., Yamaguchi, K., Aso, M., "Rear projection type laser phosphor display using two uni-axial MEMS scanning mirror devices," International Display Workshops 2011, vol. 3, (2011). Abstract Only.

Klauer, S.G. et al., "The Impact of Driver Inattention on Near-Crash/Crash Risk: An Analysis Using the 100-Car Naturalistic Driving Study Data", U.S. Department of Transportation National Highway Traffic Safety Administration (NHTSA): DOT HS 810 594, Apr. 2006.

Li, J., "Driven to Distraction: Why do Head-Up Displays (HUDs) Impair Driving Performance?", Institute of Cognitive Science, Carleton University, Ottawa, Ontario, (2007).

Milanović, V. "Linearized Gimbal-less Two-Axis MEMS Mirrors," 2009 Optical Fiber Communication Conference and Exposition (OFC'09), San Diego, CA, Mar. 25, 2009.

Milanović, V., Castelino, K., "Sub-100 μs Settling Time and Low Voltage Operation for Gimbal-less Two-Axis Scanners," IEEE/LEOS Optical MEMS 2004, Takamatsu, Japan, Aug. 2004.

Milanović, V., Castelino, K., McCormick, D., "Highly Adaptable MEMS-based Display with Wide Projection Angle," 2007 IEEE Int. Conf. on Microelectromechanical Systems (MEMS'07), Kobe, Japan, Jan. 25, 2007.

Milanović, V., Matus, G., McCormick, D.T., "Gimbal-less Monolithic Silicon Actuators For Tip-Tilt-Piston Micromirror Applications," IEEE J. of Select Topics in Quantum Electronics, vol. 10, No. 3, pp. 462-471, Jun. 2004.

Miner, A., Milanović, V., "High Temperature Operation of Gimbal-less Two-Axis Micromirrors," 2007 IEEE/LEOS Optical MEMS and Their Applications Conf., Hualien, Taiwan, Aug. 12, 2007.

Najm, W. et al., "Evaluation of an Automotive Rear-End Collision Avoidance System", U.S. Department of Transportation National Highway Traffic Safety Administration (NHTSA): DOT HS 810 569, Mar. 2006.

Non-Final Office Action for U.S. Appl. No. 16/455,498, dated Nov. 6, 2019.

Non-Final/Final Office Action for U.S. Appl. No. 15/202,476, dated Jan. 29, 2018.

Notice of Allowance dated Feb. 11, 2020 for U.S. Appl. No. 16/455,498.

Notice of Allowance for U.S. Appl. No. 15/202,476, dated Mar. 14, 2019.

Sun, T.X., Cheng, B., "A New Emissive Projection Display Technology and a High Contrast DLP Projection Display on Black Screen," SPIE Proceedings 7932, Feb. 2011.

Treat, J. et al., "Tri-level study on the causes of traffic accidents," US Department of Transportation, Final report: DOT HS-805-086, (1979).

U.S. Appl. No. 15/202,476, to Veljko Milanović et al., filed Jul. 5, 2016.

U.S. Appl. No. 60/526,510, to Veljko Milanović, filed Dec. 2, 2003.

U.S. Appl. No. 11/465,835, to Veljko Milanović, filed Aug. 21, 2006.

Veljko Milanovic, Abhishek Kasturi, "High brightness MEMS mirror based head-up display (HUD) modules with wireless data streaming capability ," SPIE 2015 OPTO Conference, San Francisco, CA, Feb. 2015.

Yole Developpment, "Light engines: new applications will drive market growth", http://www.epic-assoc.com/sources/members-area/proceedings/13mounier.pdf, Jul. 2007.

Non-Final Office Action for U.S. Appl. No. 17/551,487, dated Oct. 5, 2023.

Non-Final Office Action for U.S. Appl. No. 17/551,497, dated Oct. 5, 2024.

Notice of Allowance for U.S. Appl. No. 17/551,539, dated Oct. 12, 2023.

Notice of Allowance for U.S. Appl. No. 17/551,511, dated Oct. 12, 2023.

Notice of Allowance for U.S. Appl. No. 17/551,487, dated Dec. 15, 2023.

Notice of Allowance for U.S. Appl. No. 17/551,570, dated Nov. 9, 2023.

* cited by examiner

Direct Projection

Mirrored
Projection

Multiple MEMS
Scan Modules

FES Direct Backside Projection

FES with Reflector Backing

FES with Dichroic Mirror

FES Uniform Type

FES Region Type with Reflector Backing

FES Region Type with Pre-Patterned Fixed Content with Reflector Backing

FES Striped Type with Reflector Backing

FIG. 5A Automotive HUD
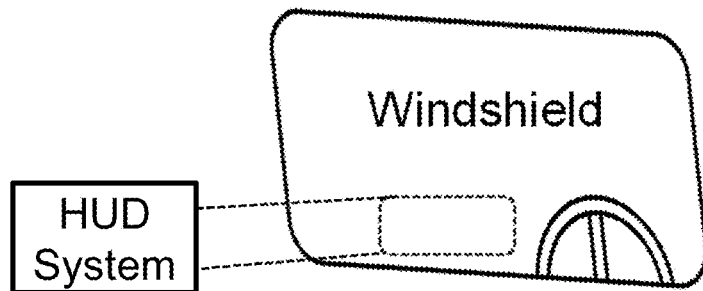
FIG. 5B HUD within a Helmet
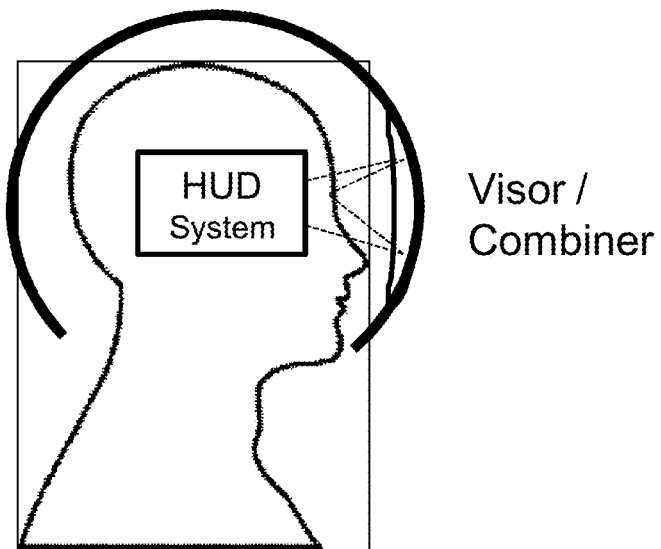
FIG. 5C HUD for Speaker
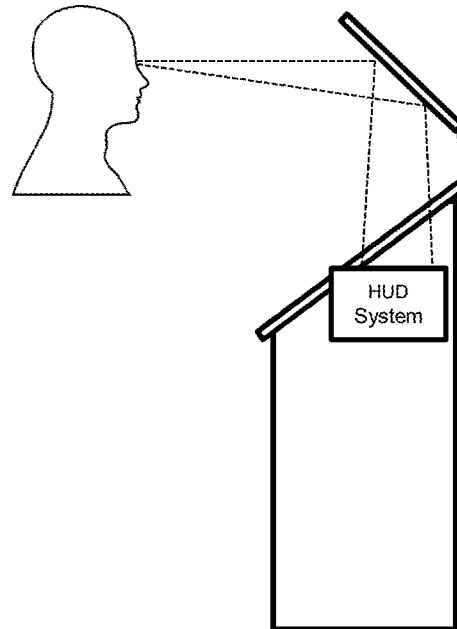

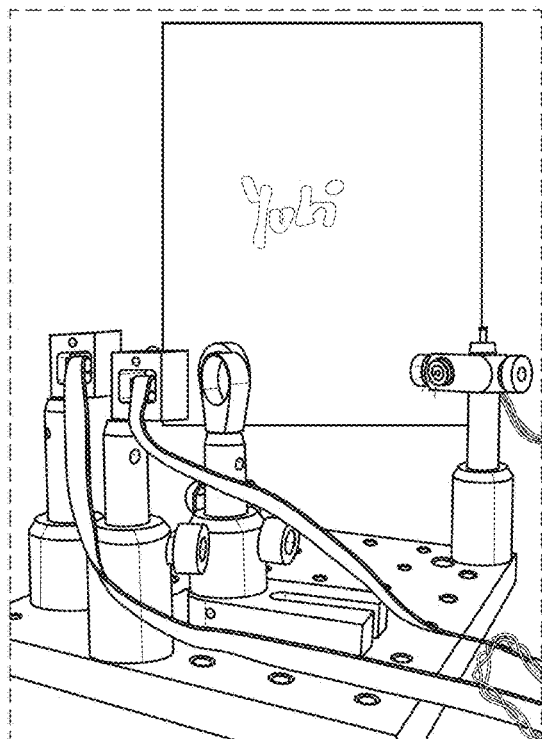
Combined Scan Mode 2
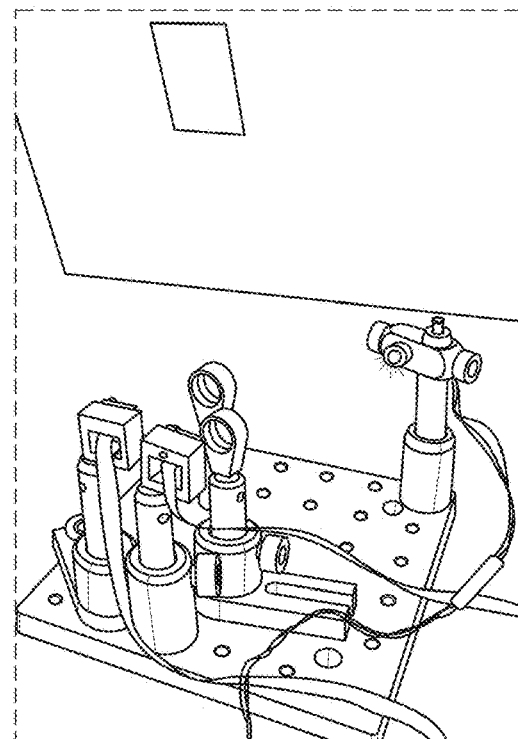
Combined Scan Mode 1
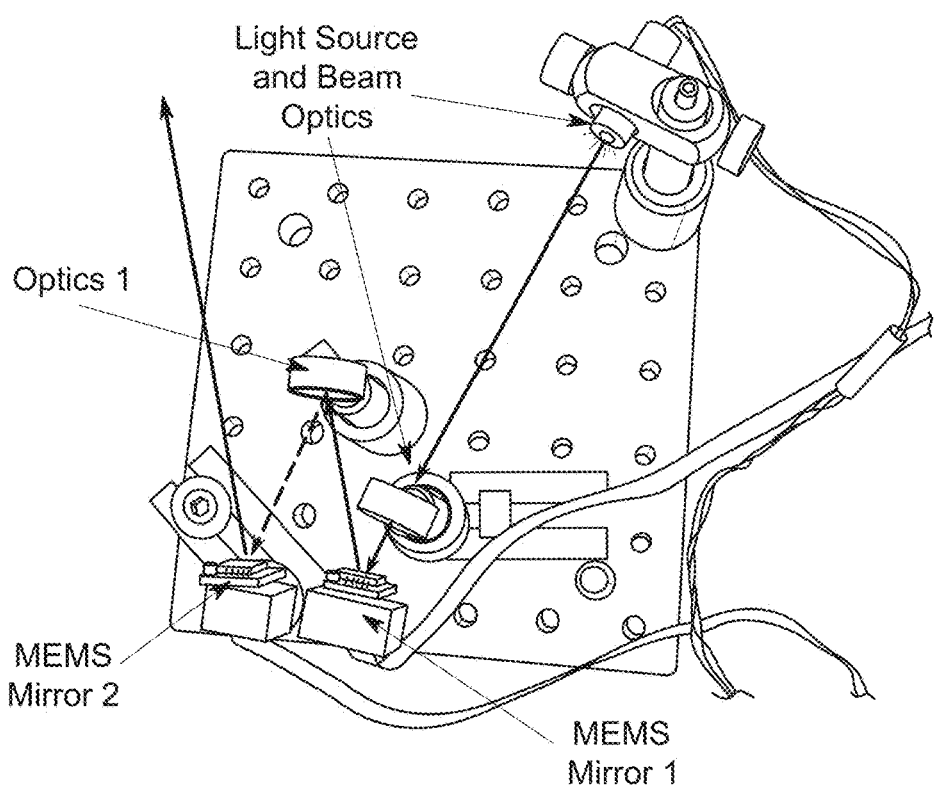
FIG. 7C

**MEMS Mirror 1: Resonant Single-Axis (R-1D),
Left-Right Scan**
**MEMS Mirror 2, Quasistatic Single-Axis (Q-1D),
Up-Down Scan**
Output Scan
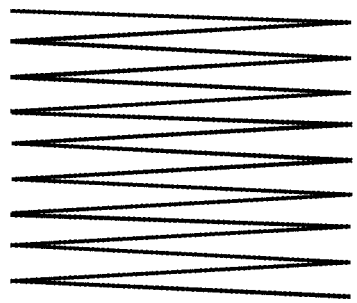
FIG. 8A

**MEMS Mirror 1:
Resonant Single-Axis
(R-1D), Left-Right Scan**
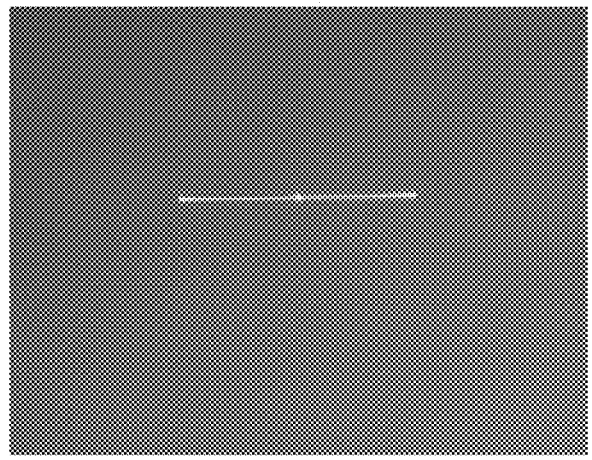
**MEMS Mirror 2,
Quasistatic Single-Axis
(Q-1D), Up-Down Scan**
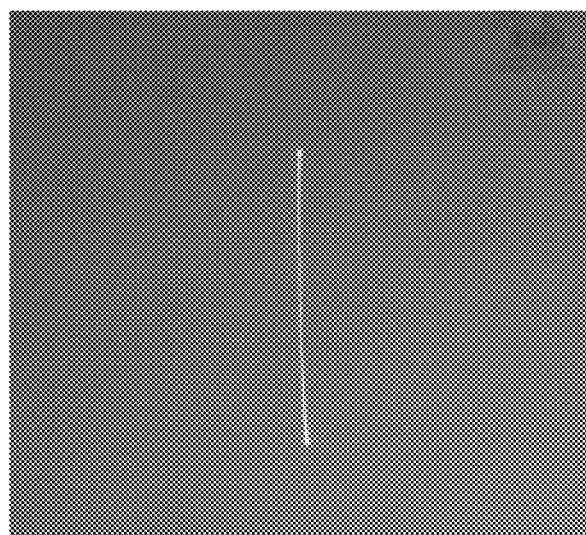
Output Scan
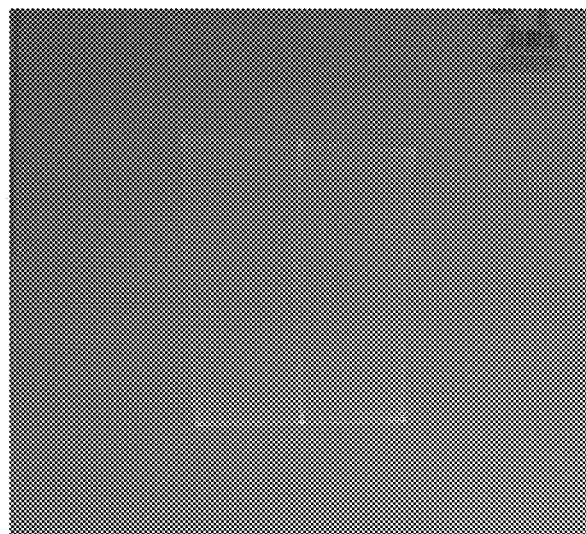
FIG. 8B

**MEMS Mirror 1: Resonant Single-Axis (R-1D),
Left-Right Scan**

↔

**MEMS Mirror 2, Quasistatic Dual-Axis (4Q),
2D Vector Scan**

MTI

Output Scan

MTI

MEMS Mirror 1:
Resonant Single-Axis
(R-1D), Left-Right Scan
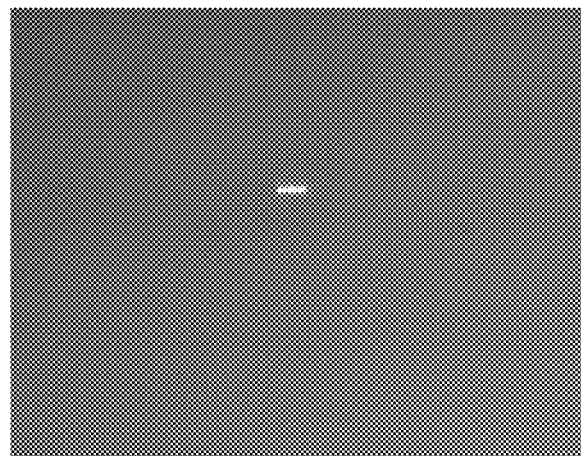
MEMS Mirror 2, Quasistatic
Dual-Axis (4Q),
2D Vector Scan
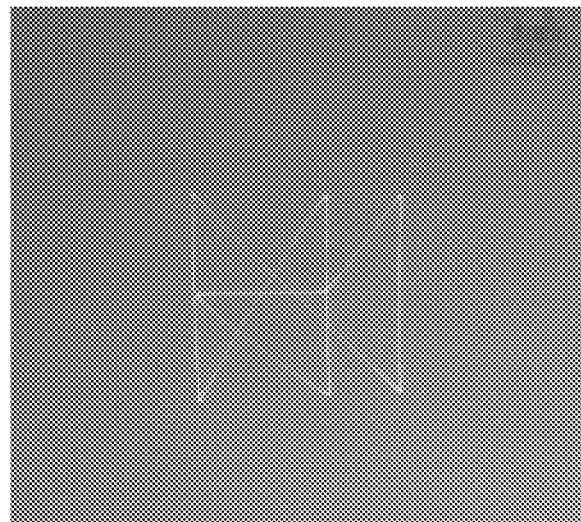
Output Scan
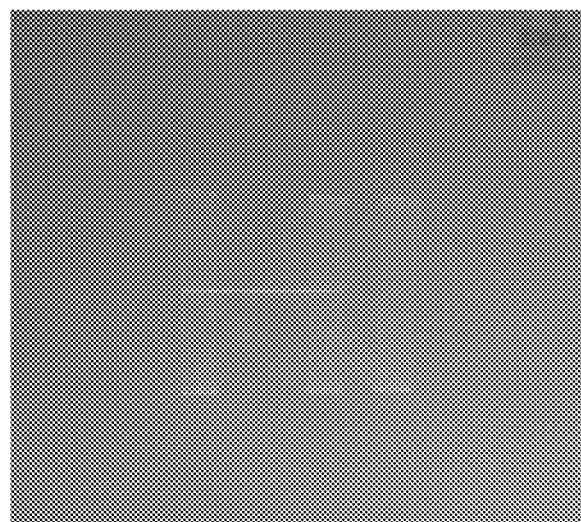
FIG. 8D

MEMS Mirror 1: Resonant-Quasistatic (RQ), Raster Scan
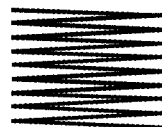
MEMS Mirror 2, Quasistatic Dual-Axis (4Q), 2D Vector Scan
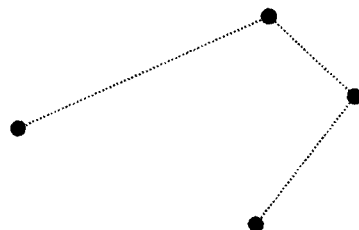
Output Scan
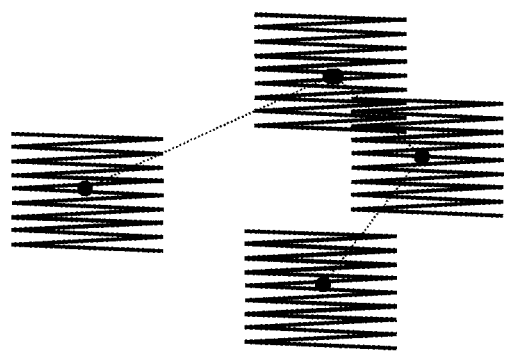
FIG. 8E

**MEMS Mirror 1: Quasistatic Dual-Axis (4Q),
2D Vector Scan**
M
**MEMS Mirror 2, Quasistatic Dual-Axis (4Q),
2D Vector Scan**
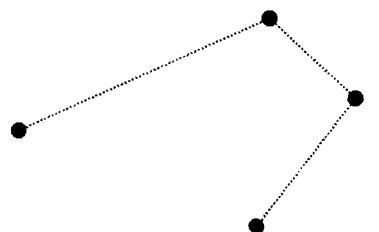
Output Scan
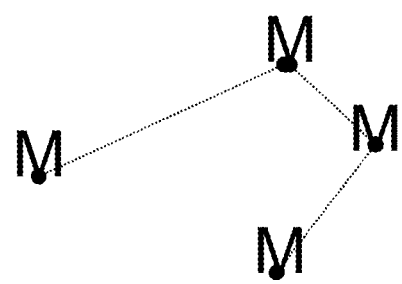
FIG. 8F

MEMS Mirror 1: Resonant Single-Axis (R-1D), Left-Right Scan
MEMS Mirror 2, Resonant Single-Axis (R-1D), Left-Right Scan
Output Scan
FIG. 8G

MEMS Mirror 1: Quasistatic Dual-Axis (4Q), 2D Vector Scan
MEMS Mirror 2, Quasistatic Dual-Axis (4Q), 2D Vector Scan
Output Scan
FIG. 8H

HEAD UP DISPLAY BASED ON LASER MEMS EMISSIVE FILM PROJECTION SYSTEM

CLAIM OF PRIORITY

This application is a continuation of U.S. patent application Ser. No. 16/455,498 filed Jun. 27, 2019, the entire contents of which are incorporated herein by reference. U.S. patent application Ser. No. 16/455,498 is division of U.S. patent application Ser. No. 15/202,476, filed Jul. 5, 2016 (now U.S. Pat. No. 10,338,377), the entire contents of which are incorporated herein by reference. U.S. patent application Ser. No. 15/202,476 claims the priority benefit of U.S. Provisional Patent Application No. 62/189,076, filed Jul. 6, 2016, the entire contents of which are incorporated herein by reference.

CROSS-REFERENCE TO RELATED APPLICATIONS

This application is related to U.S. Pat. No. 7,295,726, US Patent Application Publication number 20080061026, U.S. patent application Ser. No. 11/465,835, filed Aug. 21, 2006 (now U.S. Pat. No. 7,428,353), and U.S. Provisional Patent Application No. 60/526,510, filed Dec. 2, 2003, the contents of all five of which are incorporated herein by reference.

BACKGROUND OF INVENTION

Head-up displays (HUDs) were introduced in automobiles by GM in 1988. In the past decade they have been offered by several automakers, although covering only a small niche of the market. They are now available in many high end car models from various manufacturers, as standard or optional features, thanks to significant R&D progress during the last decade. However, in contradiction to various forecasts, HUDs have still not penetrated the automotive market nearly as much as expected [1]. Automotive safety has been stated as the main driving force for implementing HUDs, which are capable of displaying information without requiring the user to take their eyes off the road, e.g. content from night vision cameras, navigation systems, and others. Studies of driving behavior found that improper lookout, inattention and distraction [2], as well as "eyes-off-road durations of greater than two seconds", have significant impact on crash risks [3]. An analysis of rear-end collision avoidance systems concludes that nearly 40% of drivers "appeared to be distracted within five seconds before the crash-imminent alert." [4] Altogether, it has been found that keeping the driver's attention on the road is one of the biggest contributors to avoid accidents. This of course is strongly coupled with the driver's vision being aimed ahead of the vehicle, through the car's windshield.

For future HUD applications, researchers have proposed different scenarios based on advanced environmental recognition technologies to support and alert the user. For example, systems could highlight traffic signs or obstacles on the road, alerting the driver of what to expect ahead in all road conditions. These extended "augmented reality" versions may utilize parts or the whole windshield of the car to cover whole outside scenario. In contrast to "augmented reality", the stated safety increase based on the HUD use is primarily derived from the fact that all necessary information from the dashboard is displayed on the windshield and that it is highly simplified and not overloading the driver [5]. Bringing all strings together leads to the conclusion that an automotive head-up display is intended to project much of the regular information the driver would otherwise get from the dashboard, displayed in a minimalistic and common way to minimize driver distraction. This information may include vehicle speed, gear, radio settings, and navigation information.

A light engine creates the necessary light with a monochrome or multi-color content for the projection. Recently, there has been increased focus on MEMS-based laser-scanning light engines due to their compact size and saturated color content capability [6]. This light is projected onto a screen surface, also termed the exit pupil expander or EPE [6], which is typically a diffuser plate placed at an adequate distance from the projector to achieve needed image size. This screen, typically several centimeters on the diagonal, is actually viewed by the driver due to the alignment of folding mirrors and lenses which make it visible "through" the windshield or a separate combiner plate. The optical path between the diffuser plate and the combiner may include a fairly complex set of folding mirrors and aspheric mirrors or lenses to achieve both a larger virtual image size as well as a greater perceived distance between the driver and the virtual image. In existing HUDs, total distance of the virtual image to the driver may be between 1.5 m to 2 m.

This type of display offers a number of very desirable properties, for example the long focal distance to the image for driver's additional comfort and the fact that the information is mostly available only to the driver and not viewable by others. On the other hand it is less efficient (electrical power to actual viewable optical brightness) and bears severe challenges which we will briefly outline. The image on the diffuser plate has to pass several mirrors and/or lenses, each of which result in some brightness loss. Furthermore, the final reflection from the transparent windshield or combiner plate is low (typically less than 25% reflected), i.e. the image transmitted through the windshield to the area above the vehicle is brighter than the one viewed by the driver. But the real challenges in brightness and inefficiency happen prior to this optical train. RGB lasers have low efficiency, especially green lasers, which limits the maximum brightness of the system. Laser combining optics which form a single laser beam, and MEMS projectors can have a further 50% loss. The diffuser plate can have efficiency below 50%.

Regarding the forming of the image content itself, there is an additional inefficiency. A typical non-distracting HUD image is mostly empty space and a small percent of the available image area contains content. Due to the various beam retrace considerations in laser raster projection (active video time vs. complete period of one raster) and the small amount of content, lasers are actually utilized only a few percent of the time. Given the upper limitation on power in the RGB lasers (e.g. 50 mW for green,) the fact that the laser is turned on for roughly ~5% of the time to form images ~10-20 times lower brightness. Finally, it is found that if drivers wear polarized glasses, the display may become invisible because of its strong polarization.

One alternative approach to the "virtual image HUD" described above is a "windshield display", displaying content directly onto the windshield itself so that it can be viewed by the driver and other passengers. In 2007 we published [7] results of a project for an automotive customer to create a prototype windshield display system which could cover as much windshield area as possible. This concept was enabled by mostly transparent fluorescent emissive "Super-imaging" films [8] that were applied to the surface of the windshield or embedded in a windshield. The films contain nano particles which are substantially transparent in visible wavelengths due to their small size, however when illuminated by a 405 nm laser beam they emit incoherently and in all directions at longer wavelengths, e.g. in blue or red colors. The result is that the windshield itself has readable content presented on it while otherwise remaining transparent. In this approach all of the optical losses associated with the forming of the virtual image at a distance beyond the windshield are avoided, resulting in superior brightness. Furthermore, the resulting image on the treated windshield is viewable from almost every angle, which removes the restrictive "eye-box" challenge for the drivers.

Regardless of whether the virtual image HUD or windshield display methodology is used, our proposal is to improve the efficiencies and driver feeling by employing a single, efficient laser source, replacing the diffuser plate methodology with emissive films or remote phosphors, and displaying vector graphics content instead of rastering bitmap images. The key advantages are listed below:

No speckle noise: One of the major problems with laser-based displays is speckle noise [9]. This phenomenon based on interference of the coherent laser light is a significant drawback which trumps many advantages of the laser-based optical sources and therefore a wide variety of methodologies is employed to reduce this effect [9]. The methodologies add design complexity and moving optical parts and while only reducing the problem. In our proposed methodology where images are generated incoherently on emissive materials, speckle noise is virtually non-existent.

No polarization dependence: Unlike laser based picoprojectors or LCDs, the phosphor-emitted images are not polarized and eliminate the dimming issue for users wearing polarized (sun) glasses.

Higher efficiency and lower cost laser sources: Lasers at the 405 nm and 445-450 nm wavelengths are widely used in blue ray DVDs and other applications and have become widely popular in 3D laser printing systems and many other applications where efficient laser sources are needed at a highly competitive consumer price point. Typical efficiency of a single mode 405 nm laser diode with approx. 200 mW of output power is 20% (~5V and 200 mA). As a comparison, green laser diodes used in picoprojector type HUDs achieve at most 5% and remain very costly.

Less complex optical design: A single (color) laser diode source requires very simple optics without any dichroic mirrors and combiners as used to combine red, green, and blue lasers into a single co-axial beam. RGB lasers are not only difficult to align (especially over automotive temperature range) while reducing optical efficiency, but they are also relatively costly. With a single laser, complex color control hardware and algorithms can also be avoided.

High optical resolution: The laser based display with 405 nm wavelength can have a higher optical resolution than an RGB based display, due to the shorter wavelength laser, especially if compared with RGB's red wavelength of ~638 nm. In the case of vector graphics this results in increased image sharpness and clarity.

OBJECTIVES

The objective of the work that led to embodiments of the present invention was to develop and demonstrate an optical-MEMS based, very low cost and versatile platform for displaying content on Head-Up-Displays using emissive films. Use of MEMS mirrors with potential for use of wide-angle lenses provides the possibility of projecting in a very large volume. At the same time the technology provides low-cost production, high speed, small size, and very low power consumption.

A brief discussion of this work is included in the abstract to a presentation for SPIE Photonics West 2015 by Veljko Milanović et al, entitled "*High Brightness MEMS Mirror Based Head-Up Display (HUD) Modules with Wireless Data Streaming Capability*", [18] which is incorporated herein by reference.

An additional objective was to provide different modes of image projection for displays based on scanning mirrors, namely both vector graphics mode and bitmap/raster graphics mode, in the same system. This is what we termed "mixed mode display" and it would allow display of highly bright vector content or video content or some mixed variety, in different viewable areas, to the driver. This objective is addressed by novel optical arrangements of two or more MEMS mirrors with relay optics in between mirrors allowing for the final beam deflection and image projection to be a superposed combination of the two or more beam deflecting MEMS mirrors. These laser beam-deflecting or laser beam-steering scan heads are designed to allow fast rate rastering or vector scanning, or combination of both types of scans, or increased field of regard scans.

SUMMARY

A controller which controls the two-axis movement of the MEMS mirror and the emission of the laser source in order to display desired content, a laser source directed by a MEMS mirror to a fluorescent emissive screen, and optics which cause the image emitted by the screen appear as a virtual image to a viewer looking through a substantially transparent substrate or window.

A high brightness Head-Up Display (HUD) module was demonstrated with a fast, dual-axis MEMS mirror that displays vector images and text, utilizing its ~8 kHz bandwidth on both axes. Two methodologies were evaluated: in one, the mirror steers a laser at wide angles of >48° on transparent multi-color fluorescent emissive film and displays content directly on the windshield, and in the other the mirror displays content on reflective multi-color emissive phosphor plates reflected off the windshield to create a virtual image for the driver. The display module is compact, consisting of a single laser diode, off-the-shelf lenses and a MEMS mirror in combination with a MEMS controller to enable precise movement of the mirror's X- and Y-axis. The MEMS controller offers both USB and wireless streaming capability and we utilize a library of functions on a host computer for creating content and controlling the mirror. Integration with smart phone applications is demonstrated, utilizing the mobile device both for content generation based on various messages or data, and for content streaming to the MEMS controller via Bluetooth interface. The display unit is highly resistant to vibrations and shock, and requires only ~1.5 W to operate, even with content readable in sunlit outdoor conditions. The low power requirement is in part due to a vector graphics approach, allowing the efficient use of laser power, and also due to the use of a single, relatively high efficiency laser and simple optics.

BRIEF DESCRIPTION OF THE DRAWINGS

FIG. 5A-C illustrates variations of the HUD in different applications.

FIG. 7A-D illustrates variations of the mixed mode display with a single relay optic optics for relaying the beam scan of MEMS mirror 1 onto MEMS mirror 2 and therefore combining their scans.

FIG. 8A-H depicts the variations of the scan modes using two MEMS mirrors

DETAILED DESCRIPTION

Figure 1A:
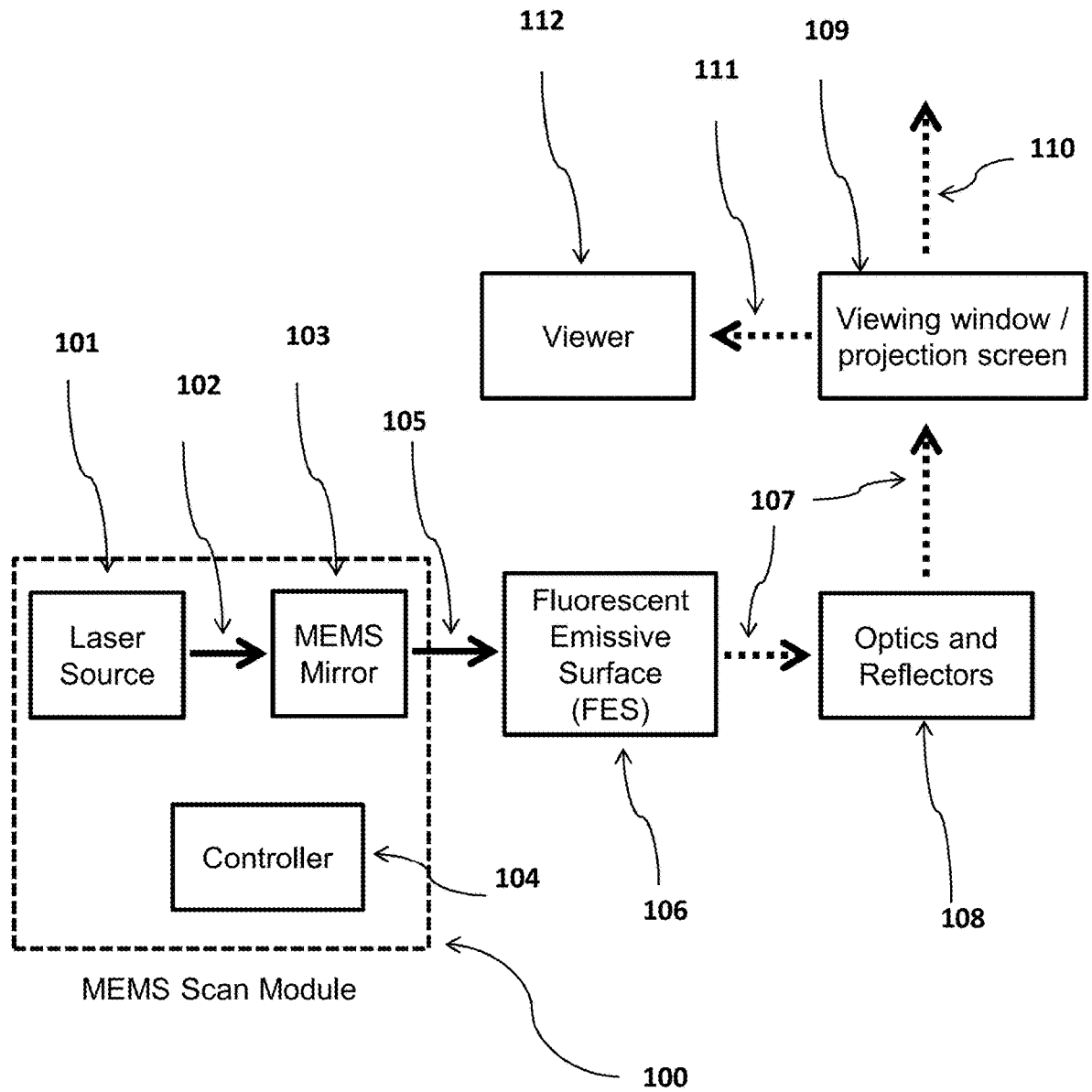
FIG. 1A illustrates a schematic overview of the present invention, the Head-Up-Display (HUD) system.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of described embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

According to an embodiment of the present invention, a system consists of a MEMS scan module 100, a Fluorescent Emissive Sheet (FES) 106, projection optics and light shaping reflectors 108, a viewing screen 109 and the viewer 112. A part of the projection is lost 110 and one virtual projection image is directed to the user 111. The users' view should be adjusted to viewer eyebox 112 to see the virtual projection. The MEMS scan module consists of a laser source of <460 nm wavelength with optics 101 to reduce the beam and fit onto a MEMS mirror 103 and a controller 104. The controller is used for content generation and adjusting the displayed content on the projection surface. The controller is used to steer the MEMS device to draw vector content and drive the laser, and can be controlled wirelessly from a mobile device, or can be connected to a computer. The MEMS mirrors are capable of scanning about two axes. Examples of suitable MEMS mirrors are described, e.g., in U.S. Pat. No. 7,295,726, US Patent Application Publication number 20080061026, U.S. patent application Ser. No. 11/465,835, and U.S. Provisional Patent Application No. 60/526,510, the contents of all four of which have been incorporated herein by reference above. The FES may be a transparent emissive film by Sun Innovations or any other vendor, which is excited by 405 nm wavelength laser, converts the energy and emits in a single color, e.g. ~450 nm blue color, or a combination of colors to form white.

Figure 1B:
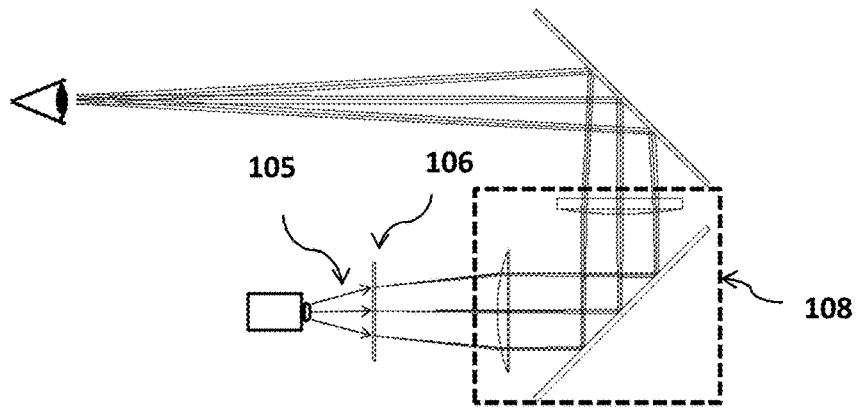
FIG. 1B-D depicts variations of the HUD optical system.
Figure 1C:
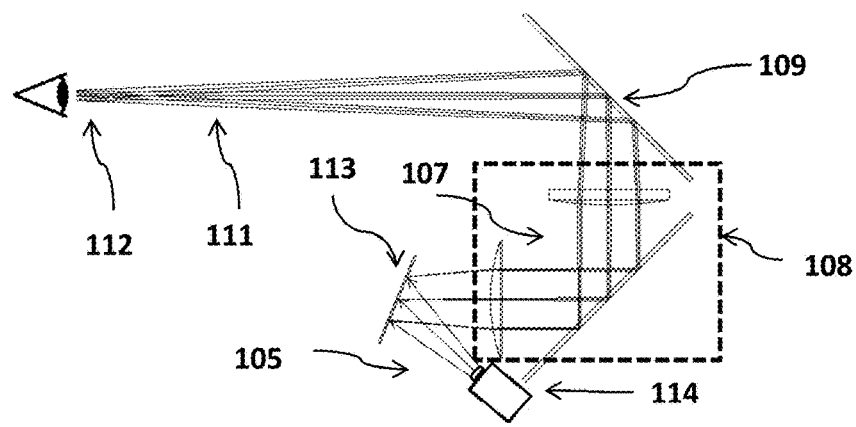
Figure 1D:
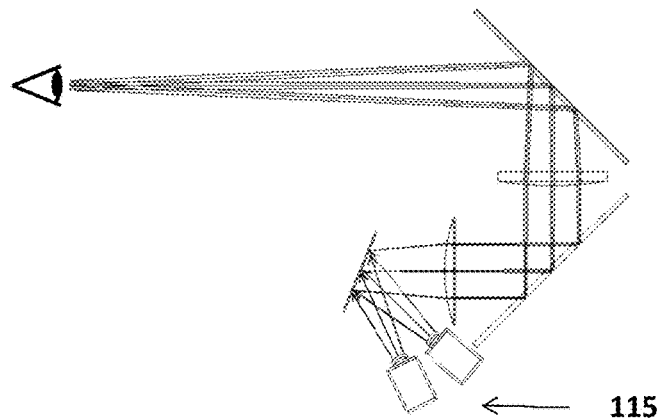

FIG. 1B shows the embodiment of the invention, with the full beam path from the MEMS scan module to the viewer, where the MEMS scan module projects 105 the content onto the FES 106, and the image is transmitted as emitted light 107 through optics and beam shaping reflectors 108 onto a viewing window 109. In other embodiments, FIG. 1C, the MEMS scan module may be placed differently 114 to use a reflective FES 113 to increase the brightness of the content 105 from the MEMS scan module. The reflective FES directs all the emitted light towards the optics 108 and onto the viewing screen 109. FIG. 1D shows a system with multiple MEMS scan modules 115 where each module may consist of two or more lasers with different wavelength which are required for different FES activation wavelengths. The system can be setup out of multiple MEMS Scan modules and multiple MEMS mirrors to increase the performance and project content at the same time.

Figure 2A:
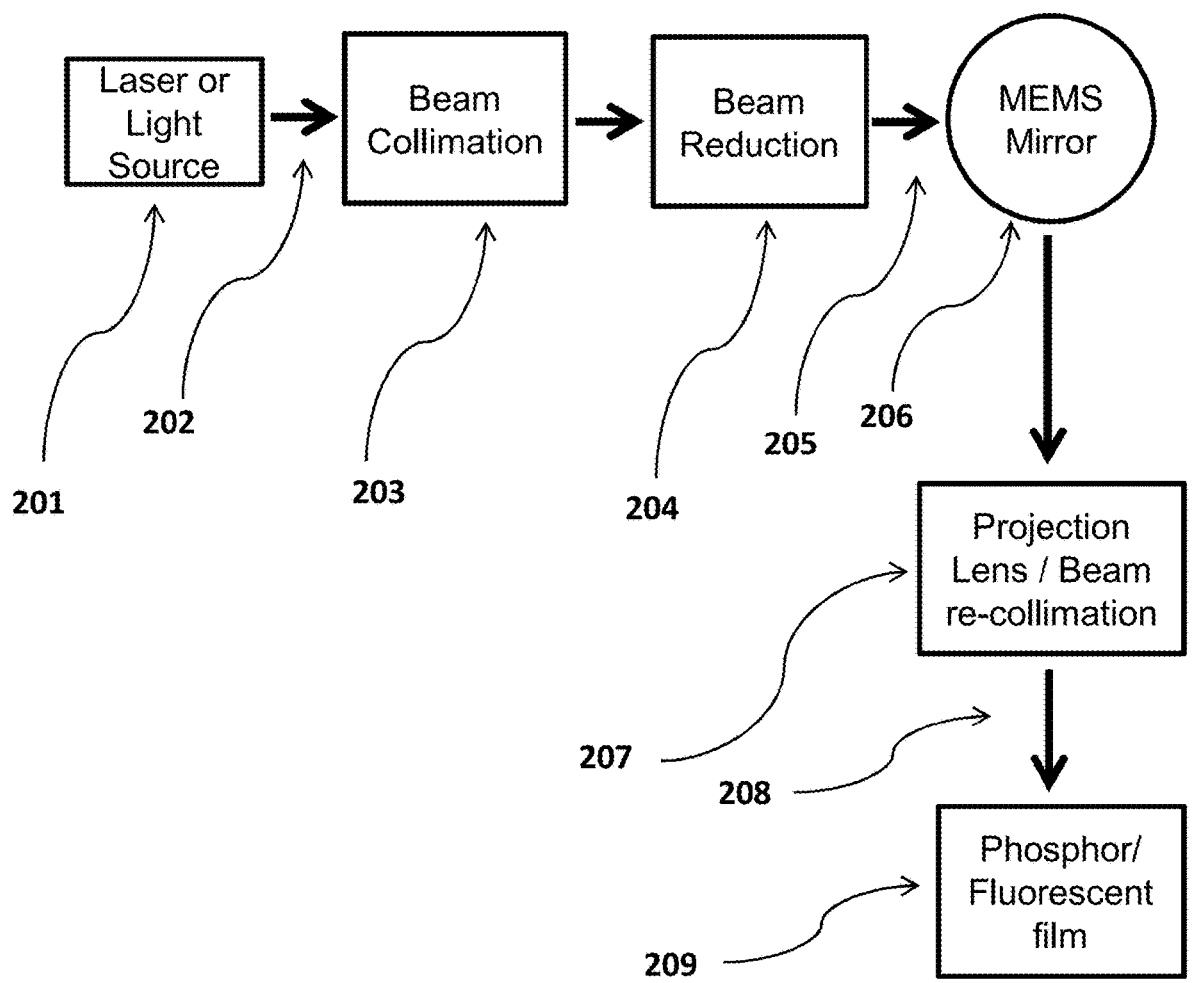
FIG. 2A illustrates a schematic overview of the optical beam path with the MEMS mirror for the HUD.
Figure 2B:
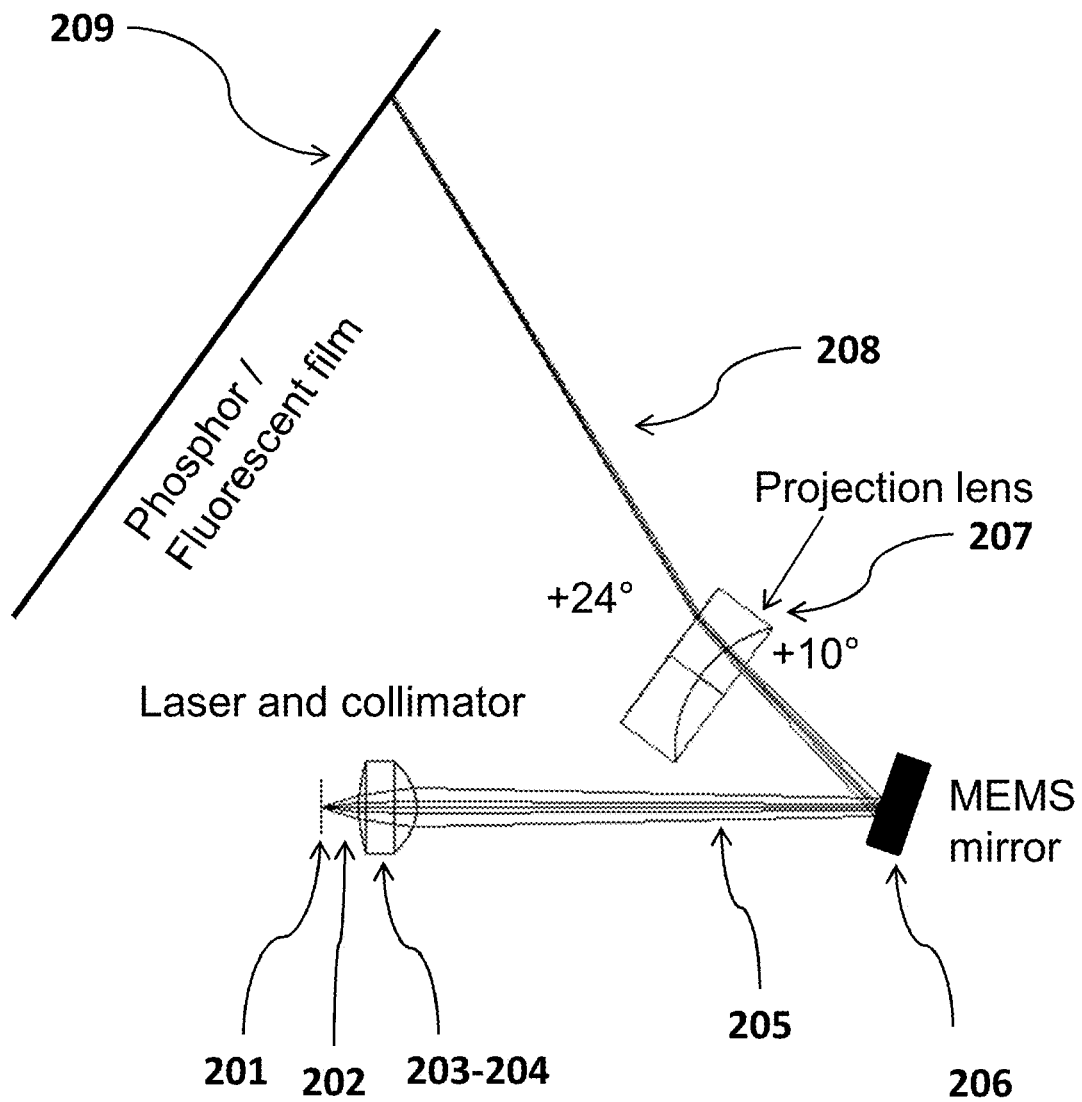
FIG. 2B depicts the optical beam conditioning from the source to the FES in the HUD.

FIG. 2A depicts a schematic of the optical beam path from the laser source 201 in the MEMS scan module to the FES 209 where the content is finally projected. The laser source 201 emits the light with a large divergence 202, and must be collimated 203 to maintain a small beam diameter. The beam 205 is further reduced with optics 204 to fit into the MEMS mirror, and re-collimated after using a projection lens 207. The beam is again collimated after the lens, maintaining a small beam diameter 208 before scanning onto the FES surface 209.

Figure 3A:
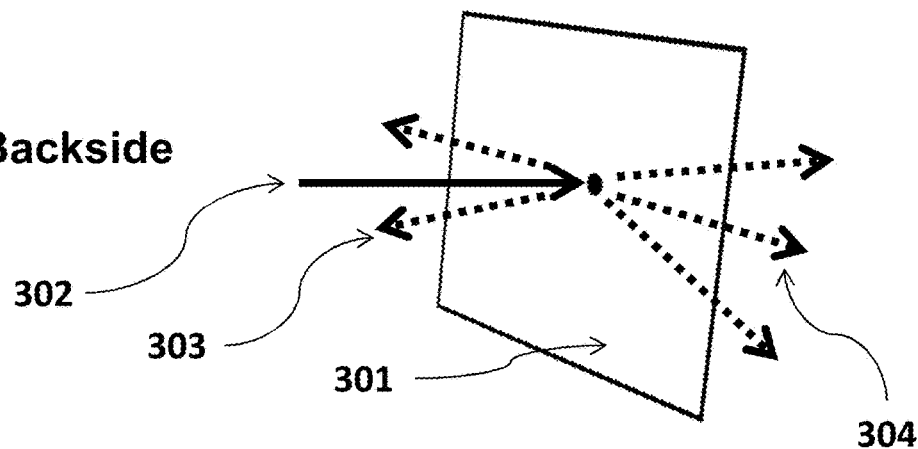
FIG. 3A-C depicts variations of the combiners with emissive surfaces and reflectors.
Figure 3B:
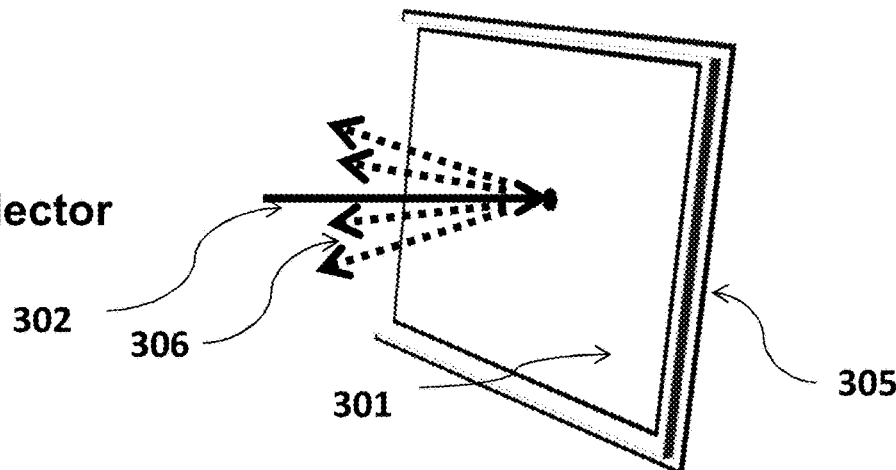
Figure 3C:
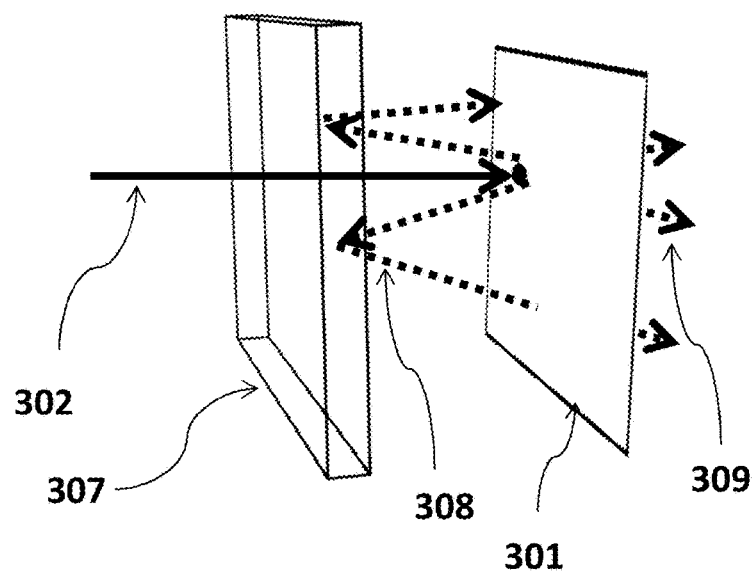
Figure 4A:
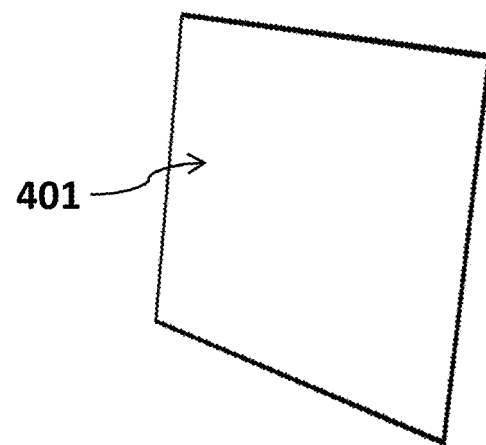
FIG. 4A-D depicts variations of patterns on the emissive panels.
Figure 4B:
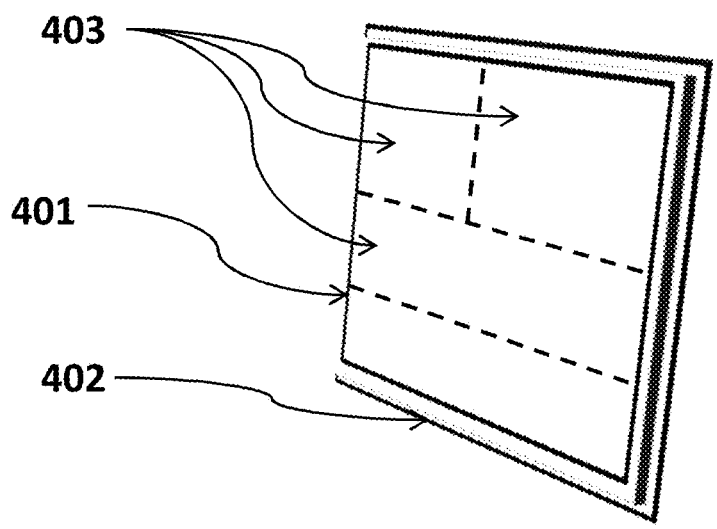
Figure 4C:
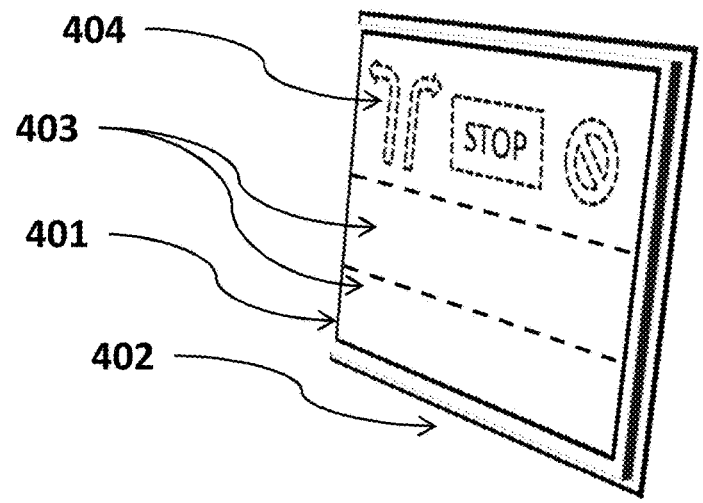
Figure 4D:
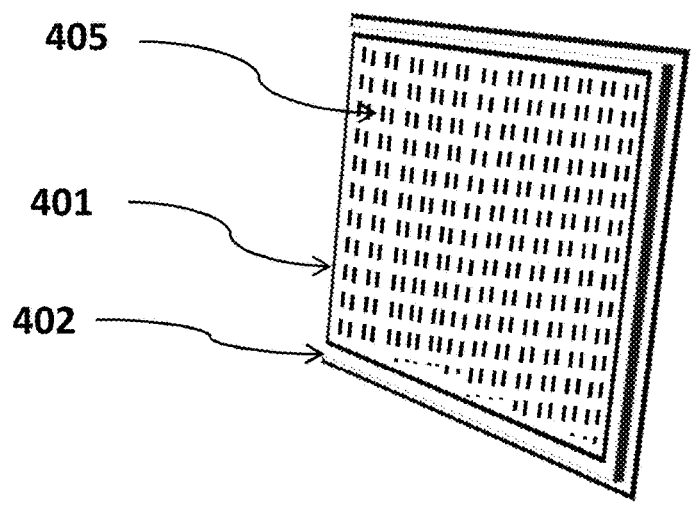

FIG. 3 illustrates variations to the combiner with the FES surface 302 to increase the brightness of the projected content 301. FIG. 3A illustrates a transmissive FES where the laser excites the FES from behind 301 and the activated phosphor emits both forward 304 to the HUD optics and backwards 303. FIG. 3B illustrates using a reflector 305 to back the FES 301 to reflect the emitted content that is converted from the FES in the same direction 306. The FES material may be deposited directly onto a highly reflective mirror surface. The FES material may be applied by adhesive to the mirror surface. The highly reflective mirror surface may be modified to achieve a certain contrast ratio or color temperature. By using the back plane with a mirror 305 the emission from the laser excitation nearly doubles the brightness, and performs as a heat sink for the panel's heat dissipation. FIG. 3C illustrates using a dichroic mirror 307 to pass the initial projected content 302 through onto the FES screen 301, and reflecting 308 only the emitted content 309 through to the HUD optics.

FIG. 4 illustrates various types of the FES surfaces that display content. FIG. 4A is a uniform FES surface such as a phosphor panel, fluorescent film, or emissive sheet 401 that displays in a single uniform color or white when a laser beam excites a specific region. FIG. 4B is a FES surface 401 with different regions that emit at different wavelengths 403 to create multi-color content. For example an area of red for showing warnings, an area in blue for indicators and an area of a white color for messages and common information. Any arrangements of color areas are possible. The FES is also backed with a reflector 402 to maximize the brightness of the various color regions. FIG. 4C is a FES 401 with different regions that emit at different wavelengths 403 to create multi-color content placed together on one reflective panel 402. Specific areas in each colored region may have additional pre-patterned content 404 for the MEMS scanner to highlight instead of generating the content with the MEMS scan. The region with the pre-patterned fixed content could be encased by non-emissive, non-reflective material.

FIG. 5 illustrates applications of the laser and MEMS based HUD system. FIG. 5A is an example of an automotive HUD system, projecting information onto the windshield. FIG. 5B shows a wearable HUD system, in this case integrated into a helmet, with the projection created onto the visor. FIG. 5C shows a HUD for public speakers, in this case integrated into a podium, to allow the user to glance at their notes without having to look away from their audience.

Figure 6A:
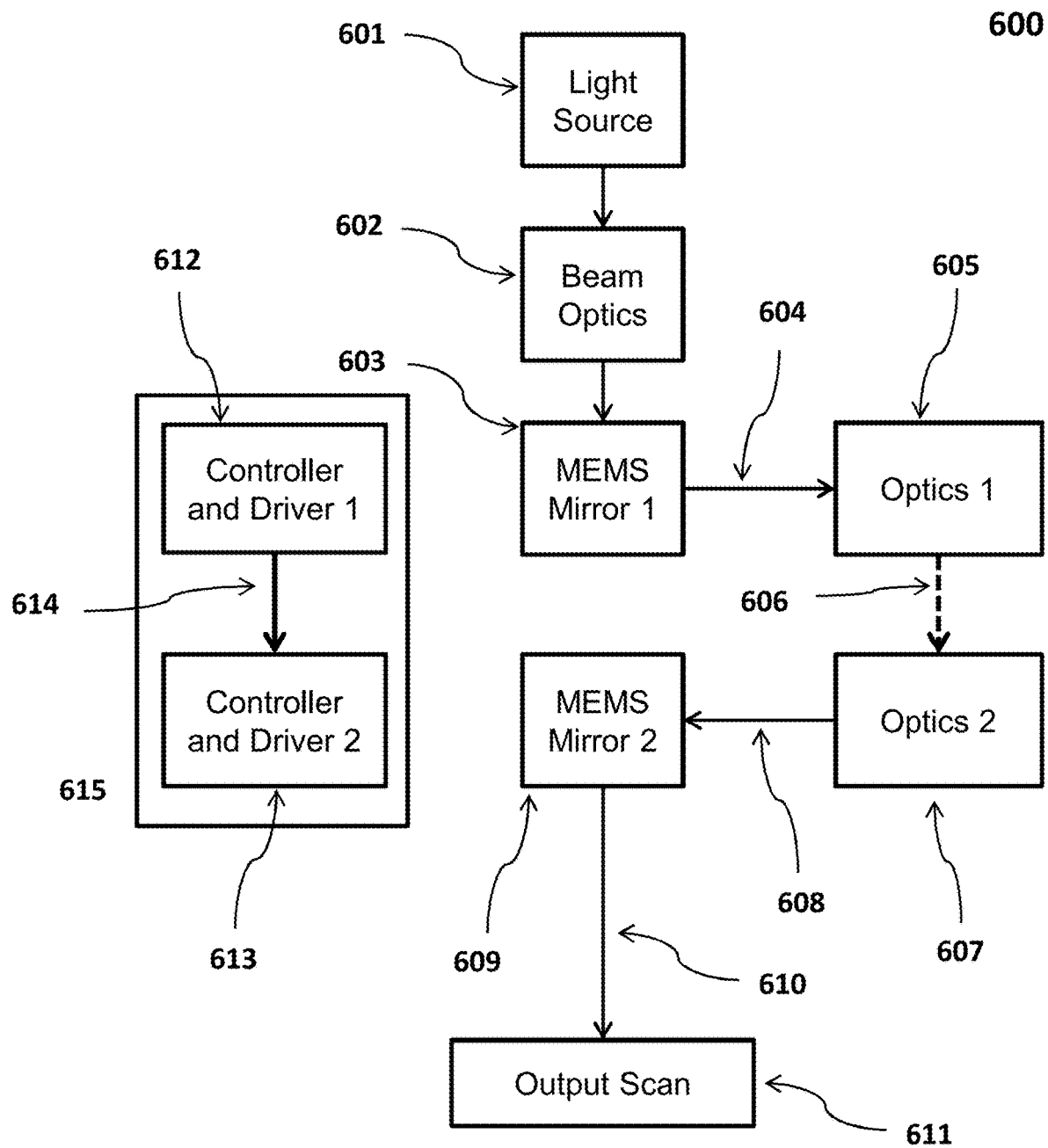
FIG. 6A-F illustrates variations of the mixed mode display with two optics for relaying the beam scan of MEMS mirror 1 onto MEMS mirror 2 and therefore combining their scans.

FIG. 6A shows the embodiment of the invention, with the full beam path from the light source 601 and beam optics 602 to the MEMS scan module 600 to the viewer, using two beam deflectors 603 and 609 (e.g., MEMS mirrors) and two relay optics 605 and 607. In this diagram, the optical beam 604 is scanned by the first MEMS mirror 603 onto the first relay optics 605. Relay optics 1 605 transforms angular scan 604 to a set of substantially parallel beams 606. Since optics 1 605 is generally of positive power, the parallel beams 606 will each have a converging nature until a focus point somewhere between optics 1 605 and optics 2 607. Prior to reaching optics 2 607 the beams are all diverging which is countered by the positive nature of relay optics 2 607—this can give the final result of re-collimated beams 608. Furthermore, the parallel beams are transformed to beams pointed at a "single point" in space at the location of MEMS mirror 2 609. The relay optics 605 and 607 are therefore employed to convey the scanning nature of beams 604 over to another location 609 or in other words image mirror 1 603 onto mirror 2 609 as if the two are both operating in the same location. It should be noted that optics 1 605 and optics 2 607 can have the same powers for 1:1 imaging but can also have different powers such that the resulting scan 608 has increased or decreased angles with respect to 604. The final output from MEMS mirror 2 610 forms a two-dimensional scan 611. Mirrors 1 and 2 can be driven by two individual controllers 612 and 613 that are synchronized in time with each other 614, or a single controller with multiple MEMS drivers 615.

Figure 6B:
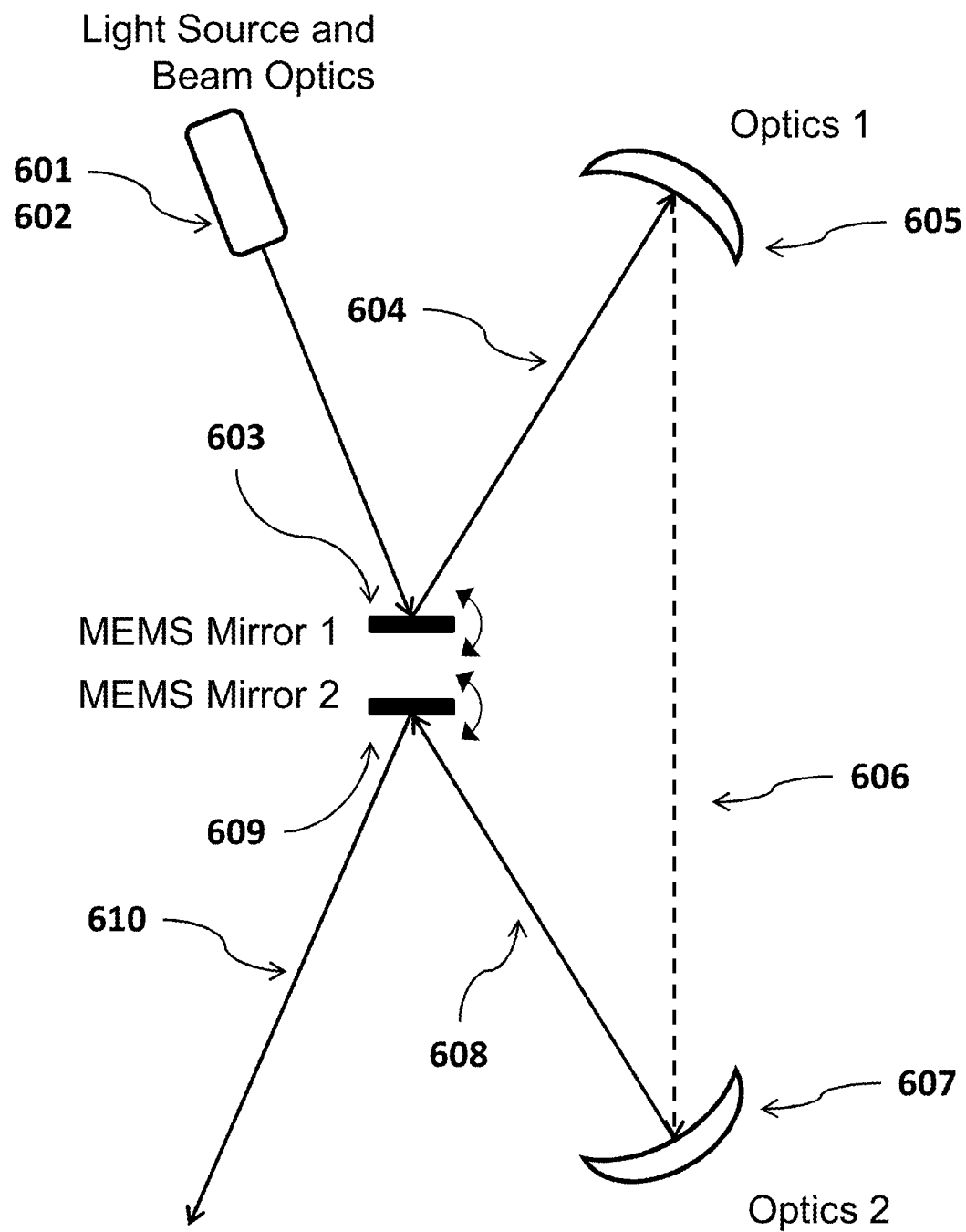

FIG. 6B depicts an opto-mechanical setup where beam deflectors 1 603 and 2 609 are placed back to back, and using reflective relay optics 605 and 607 to create the final output scan 610.

Figure 6C:
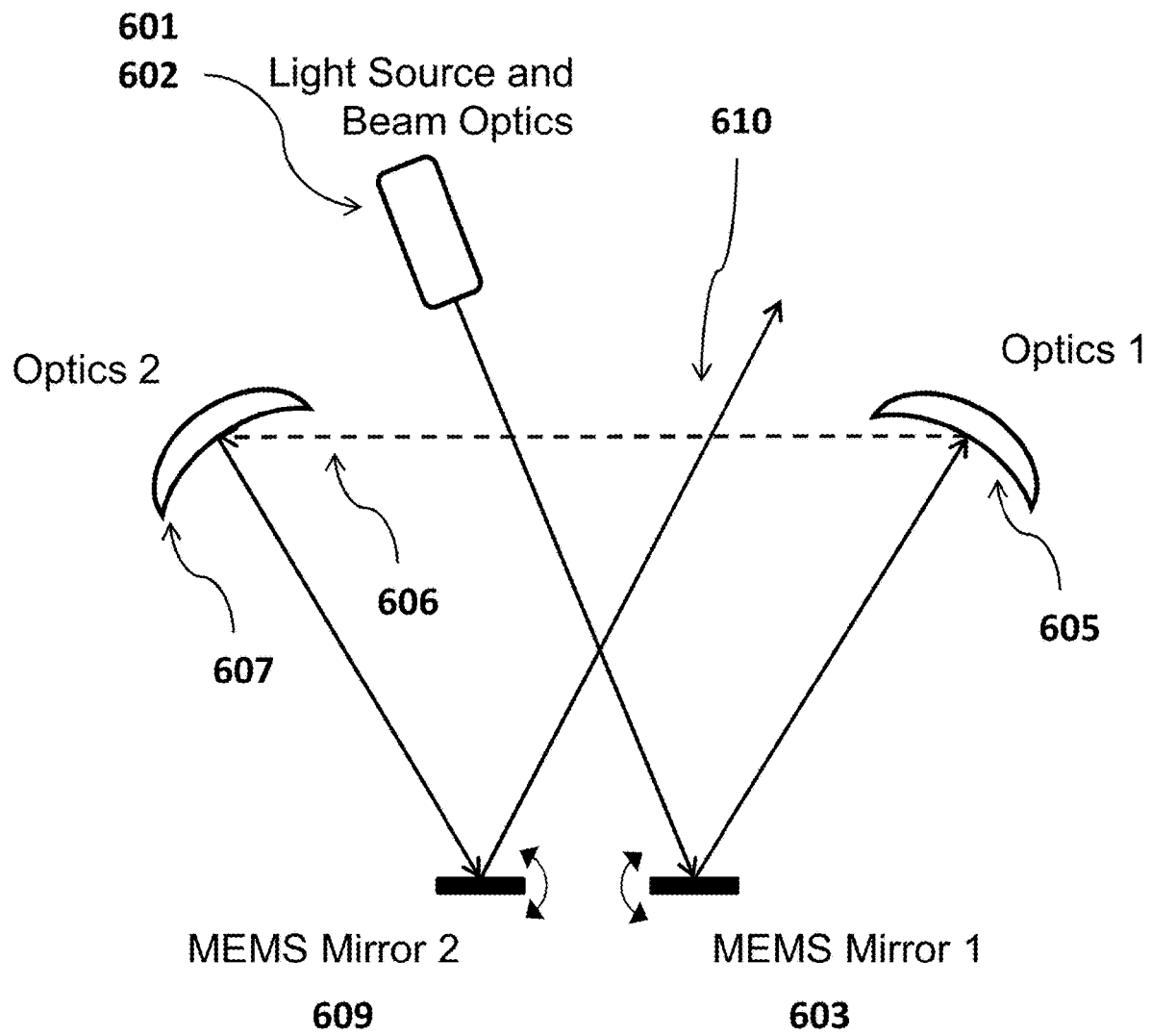

FIG. 6C depicts an opto-mechanical setup where beam deflectors 1 603 and 2 609 are placed in the same plane, scanning next to each other. The light source is placed below the plane of the reflective relay optics 605 and 607 to create the final output scan 610 above the plane of the reflective relay optics.

There are a number of different possible configurations for the relay optics 605, 607 and the beam deflectors 603, 609. By way of example, and not by way of limitation, in some implementations, the relay optics 605, 607 may include one or more of the following: off-axis parabolic reflectors, off-axis elliptical reflectors, off-axis toroidal reflectors, free-form reflectors, or free-form refractors or combinations of two or more of these. By way of example, and not by way of limitation, in some implementations, one of the beam deflectors 603, 609 may be configured to scan about one optical axis and the other beam deflector may be configured to scan about another optical axis, substantially orthogonal to the first optical axis. By way of example, and not by way of limitation, in other implementations, one of the beam deflectors 603, 609 may be configured to scan about one optical axis and the other beam deflector may be a dual-axis beam deflector, configured to scan about two orthogonal optical axes. By way of example, and not by way of limitation, in some implementations, one of the beam deflectors 603, 609 may be configured to scan about at least one optical axis and the other beam deflector is configured to synchronize with the first optical deflector, deflecting the beam about substantially the same optical axis to result in increased total beam deflection.

Figure 6D:
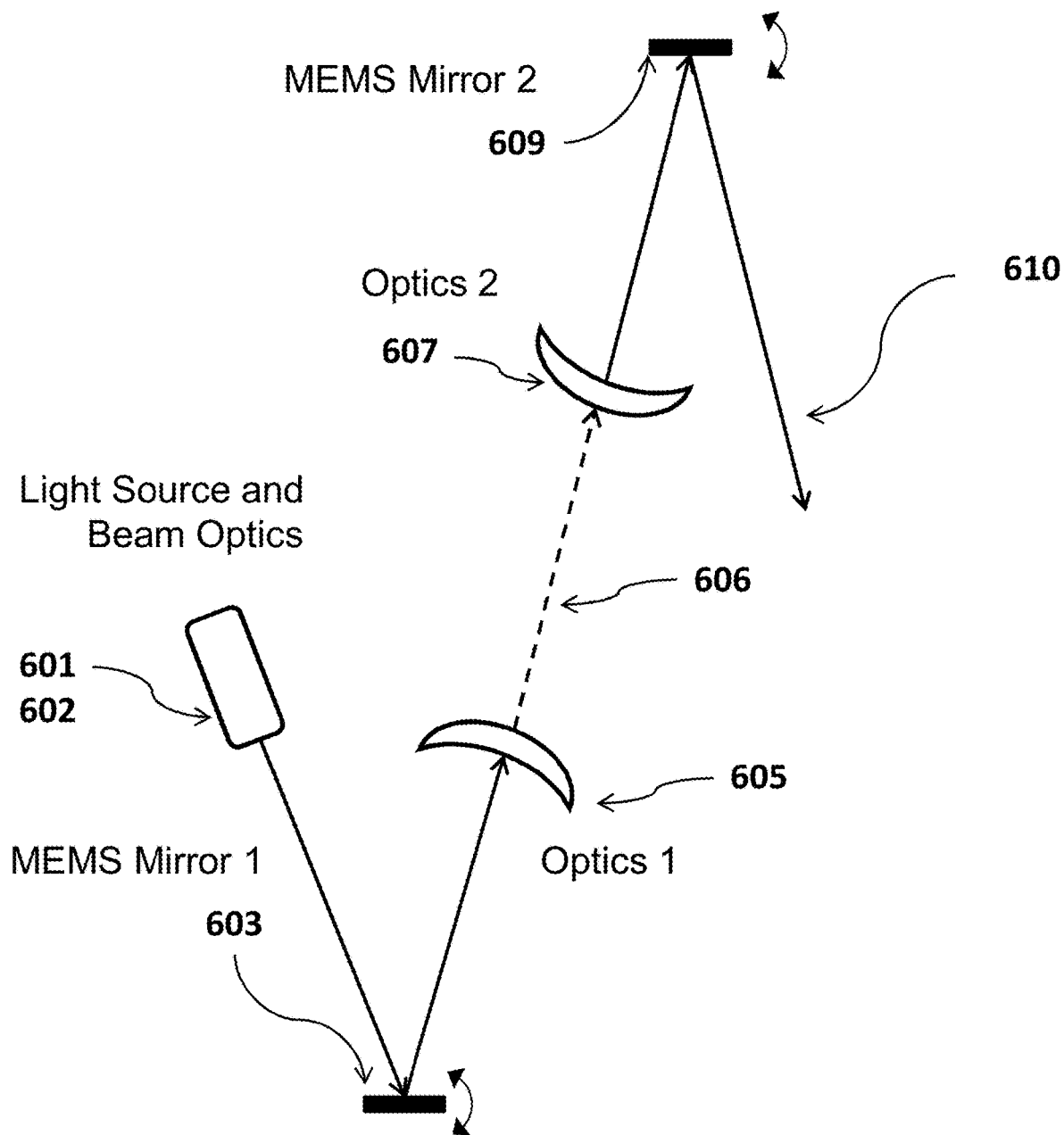
Figure 6E:
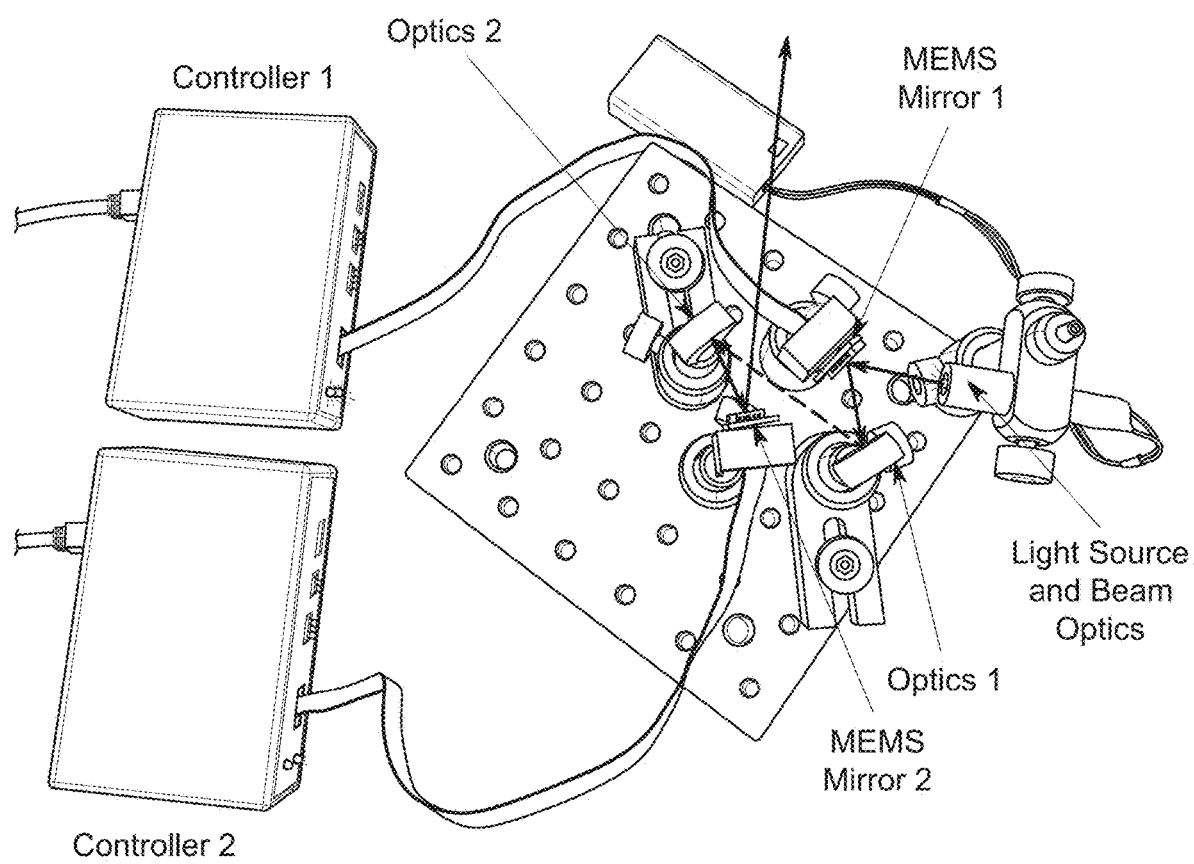

FIG. 6D depicts an opto-mechanical setup where beam deflectors 1 603 and 2 609 are placed across from each other, and using transmissive relay optics 605 and 607 to create the final output scan 610. FIG. 6E is an image of the opto-mechanical setup depicted in FIG. 6D.

Figure 6F:
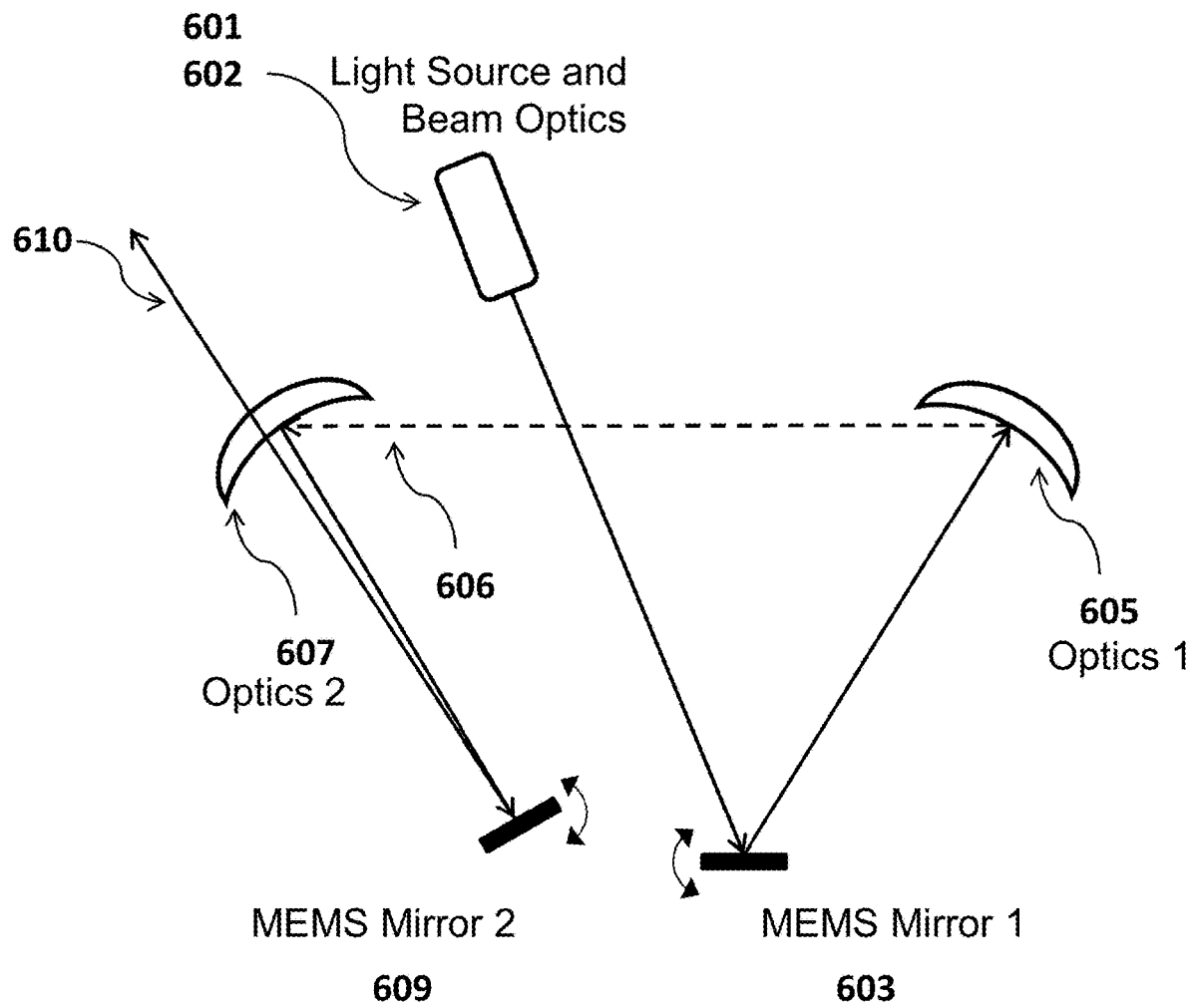

FIG. 6F is a variant of the embodiment in which MEMS mirror 2 is positioned and tilted in such a way that all possible output beams 610 return substantially in the direction of relay optic 607 however above the optic 2 and therefore can exit the system without interference with another element. Namely it is often highly desirable in the art to reduce incident angles onto MEMS mirrors so as to utilize as much of the available mirror area (clear aperture). Therefore embodiments in which angles of incidence are minimized are preferred. If the first beam deflector 603 is a single axis resonant mirror, then the relay optics 605 and 606 can be very slim in the dimension that is not scanned by the first beam deflector 603. In fact the optics would need to have the thickness out of plane of scanning only to match the beam diameter, e.g. 1-2 mm. The size in the lateral dimensions due to the large scanning angles could be several mm or longer. This very slim optical design would allow a more compact scan module. Furthermore for the output beam 610 this would mean that exiting above the second relay optic 607 does not require a very strong out of plane tilt. Therefore angles of incidence can be kept very low in both mirrors.

According to some aspects of the present disclosure, a scan module may include one or more laser sources, an optic, one or more beam deflectors, and relay optics between the two or more beam deflectors. The laser sources generate one or more initial laser beams and the beam deflectors deflect the one or more laser beams. The optic configures the initial laser beams to have a specific divergence or focusing angle. One or more beam deflector controllers coupled to the beam deflectors control the angle of beam deflection from each beam deflector. The relay optics are configured to image each sequential beam deflector onto the subsequent beam deflector in such a manner that the beam deflecting from the last beam deflector in the optical chain contains a combination or superposition of all the beam deflections of the beam deflectors in the sequence, and results in a desired final beam divergence.

In some implementations of the above-described apparatus, the incidence angle of the initial laser beam onto the first beam deflector may be configured to lie substantially in the plane of beam deflection of the same deflector. In some implementations of the above-described apparatus, the incidence angle of the laser beam deflected by the first beam deflector when it lies in its origin un-deflected position, and the relay optics may be configured to lie substantially in the plane of the beam deflection of the second reflector.

In some implementations of the above-described apparatus, the relay optic may be an off-axis parabolic reflector or an off-axis elliptical reflector or an off-axis toroidal reflector.

Figure 7A:
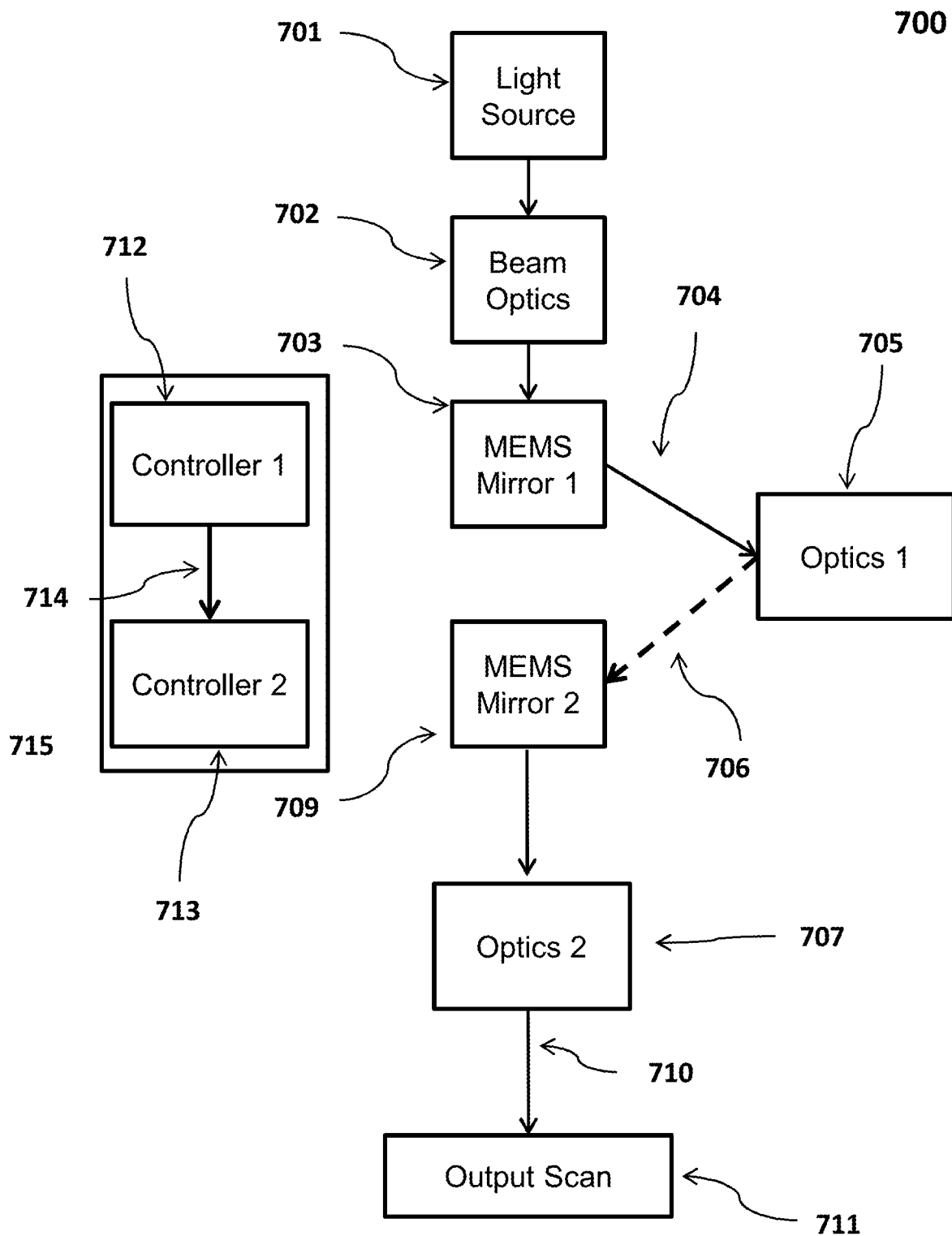

FIG. 7A shows the embodiment of the invention, with the full beam path from the MEMS scan module 700 to the output scan (displayed in some manner to the viewer), using two MEMS mirrors 703 and 709 and a single relay optic 705. As noted earlier in the scan module 600, and as known in prior art, relay optics are typically comprised of two transmissive or two reflective optic in order to both relay the scan angles of the first beam steering element onto the second beam steering element (back into a point) as well as to counter each other's optical power and allow the beam to maintain prescribed divergence (e.g. to be collimated before and after the scan module). If one were to employ a single optic to relay the scan angles from MEMS mirror 1 onto MEMS mirror 2 it would be possible in the ray trace, however the beams would have undesirable convergence and then after focus divergence, due to the power of the relay optic. Here for example an elliptical reflector may be employed with the two MEMS mirrors placed at the two foci of the ellipse, therefore imaging all deflected beams from MEMS mirror 1 directly onto MEMS mirror 2 at the second focus of the ellipse. Another possibility is the toroidal mirror with the possibility of stigmatism correction. Thus in the single-optic relay system 700 the beam optics 702 which pre-condition the beam for the scan system must incorporate such an optical power which will counter the optical power of the relay optic and allow desired divergence after that element. For example, beam optics 702 may include a collimator to firstly collimate the light source 701, and then a positive lens element with a specific focal distance, e.g. to focus somewhere between MEMS mirror 1 (703) and relay optics 705. As this beam will then diverge after the focus, this divergence will be countered by the curvature (optical power) of optic 705 which will also relay all those possible scanned beams onto MEMS mirror 2 (709). Mirrors 1 and 2 can be controlled by two individual controllers 712 and 713 that are synchronized in time with each other by a connection 714, or both mirrors could be controlled by a single controller with multiple MEMS drivers 715.

Figure 7B:
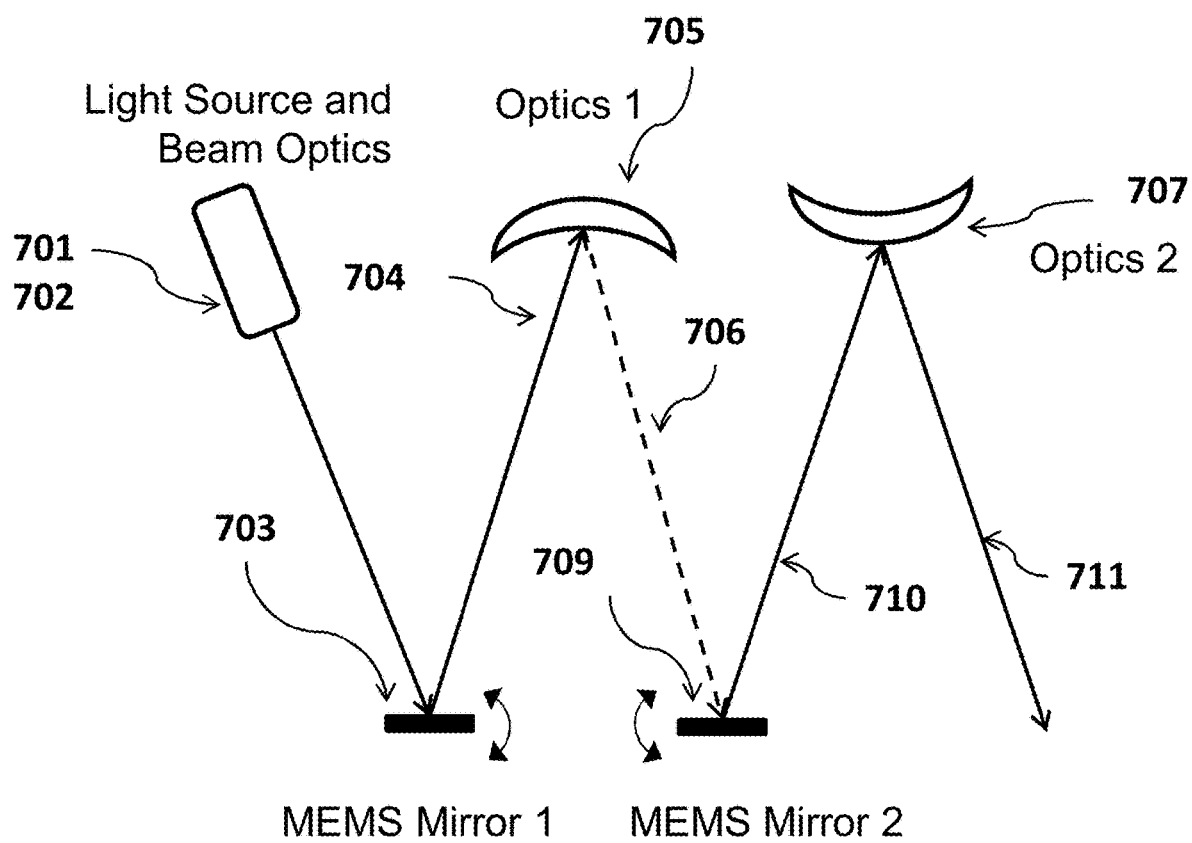

FIG. 7B depicts an opto-mechanical setup where MEMS mirrors 1 703 and 2 709 are placed in the same plane, scanning next to each other. The relay optics 705 and the scan optics 707 are reflective to create the final output scan 710. Transmissive optics can be utilized as well in either location. In this arrangement MEMS mirror 1 and MEMS Mirror 2 (703 and 709) could be placed within the same package or carrier, or could even be manufactured as a monolithic (single) chip. FIG. 7C is an image of the opto-mechanical prototype setup depicted in FIG. 7B. In the prototype we demonstrated mixed mode content with MEMS mirror 1 running at a fast resonant frequency of ~21 kHz, and MEMS mirror 2 running quasi-static or vector content. The two scans are clearly combined in the resulting red-laser images on the white screen in the background. In this embodiment MEMS mirror 1 and MEMS mirror 2 are fully separate die and are fully separately packaged and mounted, however it was noted earlier that they could be arranged within the same semiconductor package or could even be in one MEMS die or chip.

Figure 7D:
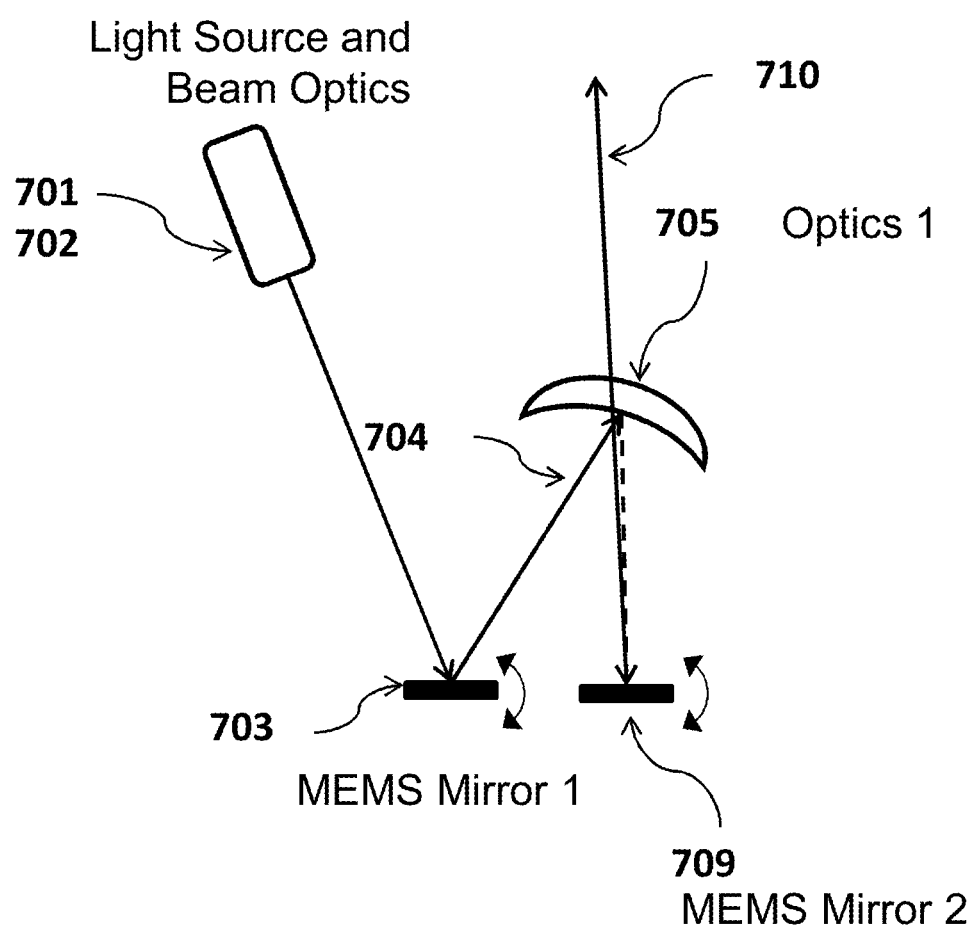

FIG. 7D is a variant of the embodiment in which MEMS mirror 2 (709) is positioned and tilted in such a way that all possible output beams 710 return substantially in the direction of relay optic 705 however above the optic and therefore can exit the system without interference with another element. Here the optic should be reduced in size in all of its dimensions to the minimum required area that can receive and deflect all possible beam deflections from the earlier portion of the optical system. For example, if the earlier optical system is configured to deflect only in one axis, then the optic can be a narrowly cut slice of an off-axis parabola for example, with one dimension covering only the beam diameter and the other dimension all of the possible laser beam positions incident onto the optic. Namely it is often highly desirable in the art to reduce incident angles onto MEMS mirrors so as to utilize as much of the available mirror area (clear aperture). Therefore embodiments in which angles of incidence are minimized are preferred. If the first MEMS mirror 703 is a single axis resonant mirror, then the relay optic 705 can be very slim in the dimension that is not scanned by MEMS mirror 703. In fact the optics would need to have the thickness out of plane of scanning only to match the beam diameter, e.g. 1-2 mm. The size in the lateral dimensions due to the large scanning angles could be several mm or longer. This very slim optical design would allow a more compact scan module. Furthermore for the output beam 710 this would mean that exiting above the relay optic 705 does not require a very strong out of plane tilt. Therefore angles of incidence can be kept very low in both mirrors. In addition, it is important to reduce distortion in the scan field of the final laser beam, that the scan head is configured such that the initial laser beam is incident onto the first mirror in the plane that substantially matches the plane of beam deflection of that mirror, if that mirror is to deflect the beam only on one axis. Furthermore, it is important that the beam incident from the relay optics is incident in the plane that substantially matches the plane of beam deflection of the second mirror, if that mirror is to deflect the beam only on one axis.

FIG. 8A illustrates the following scan mode: MEMS1 is a resonant single-axis mirror. Mirror two is a point to point or quasi-static single-axis mirror, with the orthogonal axis. Final output scan is a line by line raster as used in video display projection, ultra-fast LIDAR and biomedical imagers and other similar applications. Their scans are synchronized such that MEMS2 shifts up a line for each line scan of MEMS1. FIG. 8B contains images of the scan mode described in FIG. 8A.

Figure 8C:
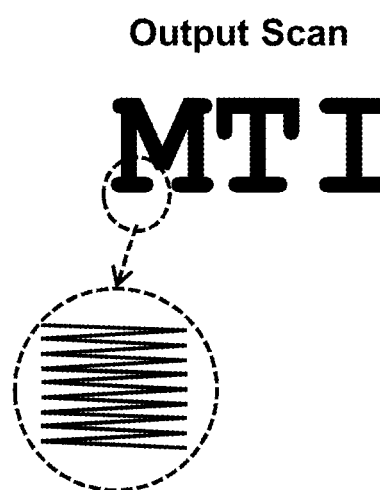

FIG. 8C illustrates the following scan mode: MEMS1 is a resonant single-axis mirror. Mirror two is a point to point or quasi-static dual-axis mirror. Final output scan is the vector graphic scan of MEMS2, however with wider or thicker lines because of the superposed scan of MEMS1. FIG. 8D contains images of the scan mode described in FIG. 8C.

FIG. 8E illustrates the following scan mode: MEMS1 is a resonant-quasistatic dual-axis mirror, where its fast axis is resonant and slow axis is point to point—the two axes form a rastering waveform which can e.g. perform video display or imaging. Mirror MEMS2 is a point to point or quasi-static dual-axis mirror, and it can therefore direct the projection from MEMS1 to different directions or different areas of the target screen.

FIG. 8F illustrates the following scan mode: MEMS1 is a quasistatic dual-axis mirror (point to point)—the two axes form a vector graphic like e.g. letter "M". MEMS2 is a point to point or quasi-static dual-axis mirror, and it can therefore direct the projection of the vector graphic from MEMS1 to different directions or different areas of the target screen.

FIG. 8G illustrates the following scan mode: MEMS1 is a resonant single-axis mirror and it forms a line-scan. MEMS2 also a resonant single-axis mirror and it forms a line-scan, synchronously with MEMS1, but since they face each other in a mirror, it is 180 deg out of phase. The resulting scan is a line scan of increased angle, doubled or otherwise depending on the relay optics.

FIG. 8H illustrates the following scan mode: MEMS1 is a quasistatic dual-axis mirror (point to point)—the two axes form a vector graphic like e.g. above shown curve. MEMS2 is a point to point or quasi-static dual-axis mirror and its two axes are synchronously driven with MEMS1 but one axis is mirrored to compensate the mirror reflection between them in the optical relay. The output is therefore the scan as MEMS2 but with increased angular range, e.g. doubled.

RESULTS

We demonstrated two concepts for higher brightness head-up displays. They are directly applicable to any displays in human field of view such as in helmets, aircraft, ships or e.g. retail store windows, automotive displays, and displays for reading. Both the virtual image HUD and the direct windshield display embodiment of the concept are focused on eliminating the need for costly, low optical power, and inefficient RGB laser modules. We demonstrated that higher power and higher efficiency 405 nm lasers are able to display multi-color content with high brightness, no speckle noise and no polarization sensitivity by facilitating emissive films and phosphor plates. In its simple form they were able to perform, battery powered, even in bright sunlight outdoor conditions. Lastly, we showed that a simple mobile device application in conjunction with after-market hardware could be utilized to achieve a high quality HUD.

Additional aspects of the present disclosure may be discerned from the accompanying paper entitled "High Brightness MEMS Mirror Based Head-Up Display (HUD) Modules with Wireless Data Streaming Capability" by Veljko Milanović, Abhishek Kasturi, and Volker Hachtel, presented at SPIE Conference on MOEMS and Miniaturized Systems XIV, San Francisco, CA Feb. 11, 2015, the entire contents of which are incorporated herein by reference and which is submitted herewith as an Appendix.

While the above is a complete description of the preferred embodiments of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC § 112, ¶6. Although certain process steps may appear in a certain order in the claims, the steps are not required to be carried out in any particular order unless a particular order is otherwise specified by the claim language.

PUBLICATION REFERENCES

[1] Yole Developpment, "Light engines: new applications will drive market growth", http://www.epic-assoc.com/sources/members-area/proceedings/13mounier.pdf, July (2007).
[2] Treat, J. et al, "Tri-level study on the causes of traffic accidents," US Department of Transportation, Final report: DOT HS-805-086, (1979).
[3] Klauer, S. G. et al, "The Impact of Driver Inattention on Near-Crash/Crash Risk: An Analysis Using the 100-Car Naturalistic Driving Study Data", U.S. Department of Transportation National Highway Traffic Safety Administration (NHTSA): DOT HS 810 594, April (2006).
[4] Najm, W. et al, "Evaluation of an Automotive Rear-End Collision Avoidance System", U.S. Department of Transportation National Highway Traffic Safety Administration (NHTSA): DOT HS 810 569, March (2006).
[5] Li, J., "Driven to Distraction: Why do Head-Up Displays (HUDs) Impair Driving Performance?", Institute of Cognitive Science, Carleton University, Ottawa, Ontario, (2007).
[6] Freeman, M. O., "MEMS Scanned Laser Head-Up Display", MOEMS and Miniaturized Systems X, Proc. Of SPIE, Vol. 7930, (2011).
[7] Milanović, V., Castelino, K., McCormick, D., "Highly Adaptable MEMS-based Display with Wide Projection Angle," 2007 IEEE Int. Conf. on Microelectromechanical Systems (MEMS'07), Kobe, Japan, January 25, (2007).
[8] Sun, T. X., Cheng, B., "A New Emissive Projection Display Technology and a High Contrast DLP Projection Display on Black Screen," SPIE Proceedings 7932, February (2011).
[9] Chen, C. Y., Su, W. C., Lin, C. H., Ke, M. D., Deng, Q. L., Chiu, K. Y., "Reduction of speckles and distortion in projection system by using a rotating diffuser," Optical Review, Volume 19, Issue 6, pp. 440-443, November (2012).
[10] Milanović, V., Matus, G., McCormick, D. T., "Gimbal-less Monolithic Silicon Actuators For Tip-Tilt-Piston Micromirror Applications," IEEE J. of Select Topics in Quantum Electronics, vol. 10, no. 3, pp. 462-471, June (2004).
[11] Milanović, V., Castelino, K., "Sub-100 µs Settling Time and Low Voltage Operation for Gimbal-less Two-Axis Scanners," IEEE/LEOS Optical MEMS 2004, Takamatsu, Japan, August (2004).
[12] Milanović, V. "Linearized Gimbal-less Two-Axis MEMS Mirrors," 2009 Optical Fiber Communication Conference and Exposition (OFC'09), San Diego, CA, March 25, (2009).
[13] Miner, A., Milanović, V., "High Temperature Operation of Gimbal-less Two-Axis Micromirrors," 2007 IEEE/LEOS Optical MEMS and Their Applications Conf, Hualien, Taiwan, August 12, (2007).
[14] Kadribašić, F., "A MEMS Mirror Laser-Guidance System for CDMS Experiments", Stanford Undergraduate Research Journal. June (2013).
[15] Chao, F., He, S., Chong, J., Mrad, R. B., Feng, L., "Development of a Micromirror Based Laser Vector Scanning Automotive HUD," Proc. Of the 2011 IEEE International Conf on Mechatronics and Automation, August 2011, China.
[16] Ishibashi, O., et al, "A Direct-View Laser-Phosphor Display with a High-Reflection Wide-Angle-Scanner," SID Digest, pp. 977-980, (2012).
[17] Kawakami, Y., Park, J. H., Akedo, J., Asada, N., Yamaguchi, K., Aso, M., "Rear projection type laser phosphor display using two uni-axial MEMS scanning mirror devices," International Display Workshops 2011, Vol. 3, (2011).
[18] Veljko Milanovic, Abhishek Kasturi, "High brightness MEMS mirror based head-up display (HUD) modules with wireless data streaming capability," SPIE 2015 OPTO Conference, San Francisco, CA, February 2015

The above cited publication references are incorporated herein by reference for all purposes.

What is claimed is:
1. An apparatus, comprising:
a scan module having one or more laser sources that generate one or more initial laser beams and two or more beam deflectors that deflect the one or more initial laser beams, wherein one of the two or more beam deflectors is configured to scan about one optical axis and another beam deflector is a dual-axis beam deflector, configured to scan about two orthogonal optical axes;
a beam optic configured to substantially collimate the one or more initial laser beams to produce one or more collimated laser beams;
one or more beam deflector controllers configured to control an angle of beam deflection from each beam deflector, wherein the one or more beam deflector controllers are configured to be controlled wirelessly from a mobile device;
relay optics between the two or more beam deflectors configured to image each sequential beam deflector in an optical chain onto the subsequent beam deflector in such a manner that the beam deflecting from a last beam deflector in the optical chain contains a combination or superposition of all the beam deflections of the beam deflectors in the sequence, and maintains a beam divergence of the one or more collimated beams.

2. The apparatus of claim 1, wherein the relay optics include off-axis parabolic reflectors.

3. The apparatus of claim 1, wherein the relay optics include off-axis elliptical reflectors.

4. The apparatus of claim 1, wherein the relay optics include off-axis toroidal reflectors.

5. The apparatus of claim 1, wherein the relay optics include free-form reflectors.

6. The apparatus of claim 1, wherein the relay optics include free-form refractors.

7. The apparatus of claim 1, wherein one of the beam deflectors is configured to scan about one optical axis and another beam deflector is configured to scan about another optical axis, substantially orthogonal to the one optical axis.

8. The apparatus of claim 1, wherein one of the beam deflectors is configured to scan about at least one optical axis and another beam deflector is configured to synchronize with the one of the beam deflectors, deflecting the beam in substantially the same optical axis to result in increased beam deflection.

9. An apparatus, comprising:
a scan module having one or more laser sources that generate one or more initial laser beams and two or more beam deflectors that deflect the one or more laser beams,
wherein one of the two or more beam deflectors is configured to scan about one optical axis and another beam deflector is a dual-axis beam deflector, configured to scan about two orthogonal optical axes;
an optic for configuring the initial laser beams to have a specific divergence or focusing angle;
one or more beam deflector controllers configured to control an angle of beam deflection from each beam deflector, wherein the one or more beam deflector controllers are configured to be controlled wirelessly from a mobile device;
relay optics between the two or more beam deflectors configured to image each sequential beam deflector in an optical chain onto the subsequent beam deflector in such a manner that the beam deflecting from a last beam deflector in the optical chain contains a combination or superposition of all the beam deflections of the beam deflectors in the sequence, and results in a desired final beam divergence.

10. The apparatus of claim 9, wherein the incidence angle of the initial laser beam onto a first beam deflector is configured to lie substantially in the plane of beam deflection of the first beam deflector.

11. The apparatus of claim 9, wherein the incidence angle of the laser beam deflected by the first beam deflector when it lies in its origin un-deflected position, and the relay optics is configured to lie substantially in the plane of the beam deflection of the second reflector.

12. The apparatus of claim 9, wherein the relay optics include an off-axis parabolic reflector.

13. The apparatus of claim 9, wherein the relay optics include an off-axis elliptical reflector.

14. The apparatus of claim 9, wherein the relay optics include an off-axis toroidal reflector.

15. The apparatus of claim 9, wherein the relay optics include free-form reflectors.

16. A method, comprising:
generating one or more initial laser beams with a scan module having one or more laser sources that generate the one or more initial laser beams and two or more beam deflectors that deflect the one or more initial laser beams, wherein one of the two or more beam deflectors is configured to scan about one optical axis and another beam deflector is a dual-axis beam deflector, configured to scan about two orthogonal optical axes;
substantially collimating the one or more initial laser beams with a beam optic to produce one or more collimated laser beams;
controlling an angle of beam deflection from each beam deflector with one or more beam deflector controllers configured to be controlled wirelessly from a mobile device;
imaging each sequential beam deflector in an optical chain onto the subsequent beam deflector in such a manner that a beam deflecting from a last beam deflector in the optical chain contains a combination or superposition of all the beam deflections of the beam deflectors in the sequence, and maintains a beam divergence of the one or more collimated laser beams.

17. The method of claim 16, wherein imaging each sequential beam deflector includes relaying the one or more collimated laser beams from a first beam deflector to a second beam deflector with relay optics between the two or more beam deflectors.

* * * * *